(12) United States Patent
Kondoh et al.

(10) Patent No.: US 6,195,361 B1
(45) Date of Patent: Feb. 27, 2001

(54) NETWORK COMMUNICATION DEVICE

(75) Inventors: Harufusa Kondoh; Masahiko Ishiwaki, both of Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 08/957,366

(22) Filed: Oct. 24, 1997

(30) Foreign Application Priority Data

May 16, 1997 (JP) .................................................. 9-127118

(51) Int. Cl.[7] .............................. H04L 12/54; H04J 3/16
(52) U.S. Cl. ................................ 370/412; 370/395
(58) Field of Search ............................ 370/229, 232, 370/235, 379, 381, 383, 392, 394, 395, 397, 399, 401, 409, 412, 444, 455, 465, 535, 413, 414, 416

(56) References Cited

U.S. PATENT DOCUMENTS

| | | | |
|---|---|---|---|
| 5,537,400 | * 7/1996 | Diaz et al. | 370/232 |
| 5,555,264 | * 9/1996 | Sallberg et al. | 370/412 |
| 5,689,505 | * 11/1997 | Chiussi et al. | 370/388 |
| 5,696,764 | * 12/1997 | Soumiya et al. | 370/395 |
| 5,862,136 | * 1/1999 | Irwin | 370/395 |
| 5,892,762 | * 4/1999 | Okuda et al. | 370/395 |
| 5,940,375 | * 8/1999 | Soumiya et al. | 370/249 |

FOREIGN PATENT DOCUMENTS 7-123094    5/1995 (JP) .

OTHER PUBLICATIONS

Kondoh, et al. "An Efficient Self–Timed Queue Architecture for ATM Switch LSI's", presented at IEEE 1994 Custom Integrated Circuits Conference, Feb. 1994, pp. 637–640.

Ishiwaki, et al., "Efficient Self–Timed Queue Architecture for a Shared–buffering ATM Switch", IEEE Technical Report, ICD–94–67, Jun. 1994, pp. 69–75.

* cited by examiner

*Primary Examiner*—Chau Nguyen
*Assistant Examiner*—Chiho Andrew Lee
(74) *Attorney, Agent, or Firm*—Burns, Doane, Swecker & Mathis, LLP

(57) ABSTRACT

A network communication device which can discard invalid packets at once is obtained. A plurality of cells received from input lines (IN#1–4) are stored in a shared buffer memory (SBM) and a control portion (CTL) manages tags and addresses. Among the received cells stored in the shared buffer memory (SBM), ones corresponding to discarded management data are not identified. Accordingly, virtually, the received cells in the shared buffer memory (SBM) can be discarded at once.

18 Claims, 17 Drawing Sheets

F I G. 1 6
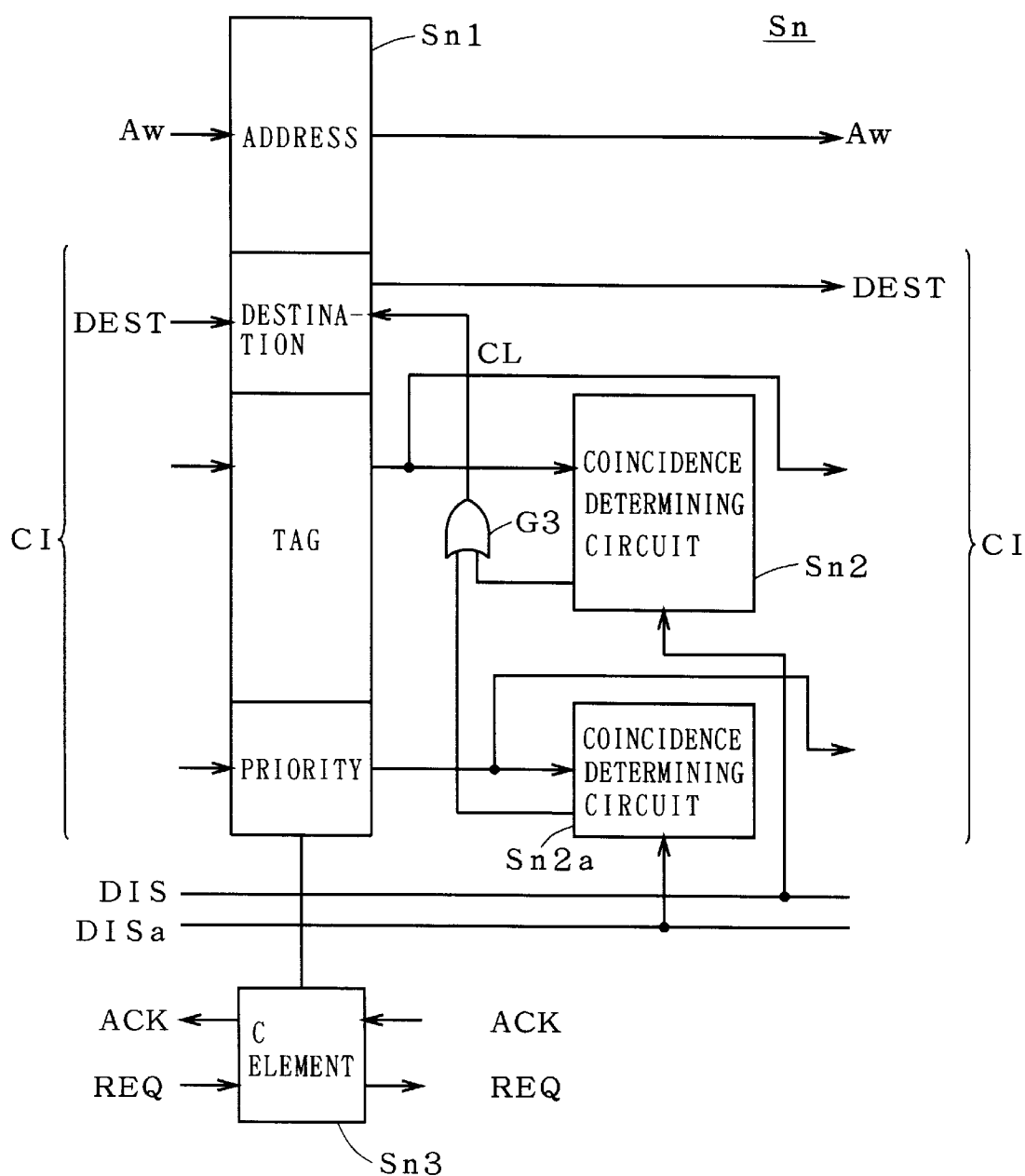

NETWORK COMMUNICATION DEVICE

BACKGROUND OF THE INVENTION

1. Field of the Invention

The present invention relates to network communication devices, such as ATM (Asynchronous Transfer Mode) switches, which discard invalid packets.

2. Description of the Background Art

The network communication devices on a network like the Ethernet switch and the ATM switch handle masses of data (hereinafter referred to as packets) as units. Such network communication devices switch packets through hardware to realize high throughput. The ATM switch is the hardware for switching lines. It is determined by an international recommendation that the ATM switches should handle fixed-length (53-byte) packets. Among the packets, fixed-length packets are called "cells."

FIG. 22 is a diagram showing the concept of an example of a conventional ATM switch 100a. Input lines IN#1–4 and output lines OUT#1–4 are connected to the ATM switch 100a. An input portion 11 is connected to the input lines IN#1–4. An output portion 13 is connected to the output lines OUT#1–4. A line interface 11a, a destination analyzing portion 11b and an in-device interface 11c are provided for each of the input lines IN#1–4. A line interface 13a, a destination adding portion 13b and an in-device interface 13c are provided for each of the output lines OUT#1–4. The input portion 11 receives cells provided with destinations from the input lines IN#1–4. In the input portion 11, data in the cells (cell data) are transferred to the switch portion 12 through the line interface 11a, the destination analyzing portion 11b for analyzing the destinations and adding in-device management information to the cell data, and the in-device interface 11c.

Next, the switch portion 12 outputs the cell data to the in-device interfaces 13c corresponding to the destinations. In the output portion 13, the cells are transferred to the target lines through the in-device interface 13c, the destination adding portion 13b for removing the in-device management information added to the cell data and adding destinations to the cells, and the line interface 13a. Thus, the switch portion 12 transfers the cells received from the plurality of input lines to the output lines corresponding to the destinations.

When a plurality of cells directed to a certain output line are received from a plurality of input lines at the same time, the cell data collide (congestion). To avoid the congestion, first, the switch portion 12 once stores the plurality of cell data received from the plurality of input lines into the built-in buffer memory BM. The plurality of cell data directed to a certain output line stored in the buffer memory BM are placed in the wait state until that output line is freed. When the output line becomes free, the switch portion 12 outputs the plurality of cell data directed to that output line to the output portion 13.

The ATM switches containing such a buffer memory BM include those called "shared-buffer ATM switches." The shared-buffer ATM switches include that described in the collection of preparatory manuscripts, Masahiko Ishiwaki et al., "Efficient Self-timed Queue Architecture for a shared-buffering ATM Switch", Institute of Electronics, Information and Communication Engineers of Japan, Integrated Circuit Study Group, ICD94-67, June 1994.

A flow of a plurality of cells (a data stream) may become invalid. This is caused by a trouble on the network or in a terminal connected to the network, for example. Such a trouble is caused when a trouble, e.g., a data error, occurs, or when a request from a source party for connecting the line (hereinafter referred to as "a call") is unexpectedly disconnected, or when a data stream with low priority is interrupted due to congestion of cells on the network, for example.

The capability of managing the cell data in the conventional buffer memory BM is limited. The cell data are, mainly, managed only with the destinations. For example, this management cannot identify cell data belonging to an invalidated data stream. Accordingly, the conventional ATM switch 100a cannot discard invalid cells in the switch portion 12, but the input portion 11 and the output portion 13 discard the invalid cells. For example, suppose that discarding information for informing that cells belonging to a particular data stream are discarded was issued outside of the ATM switch 100a and then the ATM switch received the discarding information. Then the input portion 11 of the ATM switch 100a discards the cells corresponding to the discarding information among the received cells, or the output portion 13 of the ATM switch 100a discards the cells corresponding to the discarding information.

The ATM switch 100a requires high speed performance. Particularly, when a data stream with low priority is interrupted due to congestion of cells on the network, it is preferable to immediately discard the invalid cells. If the cells are not discarded at once, the congestion cannot be avoided.

In the conventional ATM switch 100a, however, the switch portion 12 does not discard invalid cells. Accordingly, the invalid cells cannot be discarded while they exist in the buffer memory BM. After the cell discarding information has been received, the invalid cells are discarded when the corresponding output line has become free and the switch portion 12 has outputted the invalid cells directed to that output line into the output portion 13. Thus, the conventional ATM switch 100a has the problem that even if invalid cells are accumulated in the buffer memory BM, they cannot be discarded at once.

SUMMARY OF THE INVENTION

According to a first aspect of the present invention, a network communication device comprises: a storage area for storing a plurality of received packets received from a plurality of input lines; and received packet managing means for managing management data corresponding to the plurality of received packets in a one-to-one manner and each including a tag for identifying a call related to the corresponding received packet and a write address of the corresponding received packet in the storage area; wherein the received packet managing means comprises packet managing detecting means receiving discarding information for discarding a packet and the tag, for detecting the management data having the tag corresponding to the discarding information, and discards the management data detected by the packet managing detecting means.

Preferably, according to a second aspect of the present invention, in the network communication device, the received packet managing means further comprises management data storing means having a plurality of stages connected in series, for storing each management data into each of the plurality of stages in the order of reception from a preceding stage to a following stage, and management data overwriting means for overwriting, into a stage in which the management data detected by the packet managing detecting means is stored, the management data in the following stage.

Preferably, according to a third aspect of the present invention, in the network communication device, the management data further comprises a destination of the corresponding received packet, wherein the packet managing detecting means invalidates the destination of the detected management data, and the management data overwriting means overwrites, into the stage in which the management data with the invalid destination is stored, the management data in the following stage.

Preferably, according to a fourth aspect of the present invention, in the network communication device, the packet managing detecting means includes a plurality of packet managing detecting means each provided for each stage, and the network communication device further comprises discarded number detecting means for totalizing results detected by the individual packet managing detecting means.

Preferably, according to a fifth aspect of the present invention, in the network communication device, the discarded number detecting means comprises a plurality of constant-current sources each provided for each packet managing detecting means for applying a constant current when the management data having a tag corresponding to the discarding information is detected, a current bus receiving the constant current from the plurality of constant-current sources, and an analog-digital converter for analog-digital converting the current on the current bus to produce a result of the totalization.

Preferably, according to a sixth aspect of the present invention, in the network communication device, the received packet managing means comprises an idle address pool for managing free addresses of the storage area, wherein the idle address pool comprises a plurality of flags corresponding to the plurality of addresses of the storage area in a one-to-one manner for indicating whether the addresses are free or not, a plurality of tag storage portions each for storing each tag corresponding to each flag, and address managing detecting means receiving the tags in the tag storage portions and the discarding information for setting the flag corresponding to the tag storage portion having the tag corresponding to the discarding information as being free.

Preferably, according to a seventh aspect of the present invention, in the network communication device, an identifier included in a header portion of the received packet is used as the tag.

Preferably, according to an eighth aspect of the present invention, in the network communication device, discarding priority included in a header portion of the received packet is used as the tag.

Preferably, according to a ninth aspect of the present invention, in the network communication device, the identifier is formed of a plurality of bits, and the network communication device further comprises a translation table receiving the identifier for translating the identifier into a signal formed of a smaller number of bits than the plurality of bits and uses the translated signal as the tag.

Preferably, according to a tenth aspect of the present invention, in the network communication device, an identifier included in a header portion of the received packet is used as the tag.

Preferably, according to an eleventh aspect of the present invention, in the network communication device, discarding priority included in a header portion of the received packet is used as the tag.

According to the first aspect of the present invention, a plurality of packets received from a plurality of input lines are stored in the storage area and the received packet managing means manages tags and addresses as objects of management. Among the received packets stored in the storage area, ones corresponding to management data detected by the packet managing detecting means and discarded are not identified. Accordingly, virtually, the received packets in the storage area can be discarded at once.

According to the second aspect of the present invention, the management data is overwritten into a stage in which the management data detected in the packet managing detecting means is stored from the following stage. Accordingly, it is possible to discard the management data while managing the order of reception.

According to the third aspect of the present invention, when a received packet is transferred, the destination of the received packet already transferred to the output line becomes invalid and the management data overwriting means overwrites management data in the following stage into the stage with the invalid destination. On the other hand, when a received packet is discarded, the packet managing detecting means invalidates the destination of the management data and the management data overwriting means overwrites management data in the following stage into the stage with the invalid management data. Since the operations of transferring and discarding the received packets are similar to each other, the hardware can be shared to realize these operations, resulting in size reduction of the hardware.

According to the fourth aspect of the present invention, the size of the hardware of the discarded number detecting means can be reduced by utilizing the detected results.

According to the fifth aspect of the present invention, the discarded number detecting means can be formed by using constant-current sources, a current bus and an analog-digital converter.

According to the sixth aspect of the present invention, when a received packet is discarded with the tag stored in the management data storing means and the discarding information, the idle address pool can recognize it and set the address of the received packet as being free. This prevents overflow of the buffer.

According to the seventh aspect of the present invention, the identifier can be used as the tag to identify the packet. Further, it is possible to reduce the size of the hardware because the identifier can be intactly used.

According to the eighth aspect of the present invention, the packets can be discarded at once with the discarding priority to immediately ensure free area in the storage area.

According to the ninth aspect of the present invention, the translation table TA enables size reduction of the hardware.

According to the tenth aspect of the present invention, the identifier can be used as the tag to identify the packet. Further, it is possible to reduce the size of the hardware because the identifier can be intactly used.

According to the eleventh aspect of the present invention, the packets can be discarded at once with the discarding priority to immediately ensure free area in the storage area.

The present invention has been made to solve the above-mentioned problem and it is an object to obtain a network communication device having a storage area for once storing a plurality of packets received from a plurality of input lines and capable of immediately discarding invalid packets in the buffer.

These and other objects, features, aspects and advantages of the present invention will become more apparent from the following detailed description of the present invention when taken in conjunction with the accompanying drawings.

BRIEF DESCRIPTION OF THE DRAWINGS

FIG. 16 is a diagram showing an internal structure of the stage Sn in a fourth preferred embodiment of the present invention.

DESCRIPTION OF THE PREFERRED EMBODIMENTS

First Preferred Embodiment

The ATM switches include those called "shared-buffer ATM switches." The shared-buffer switches store cells received from a plurality of input lines into a shared buffer memory as received cells (received packets) and manages the received cells for each output line. The shared-buffer ATM switches include that described in the collection of preparatory manuscripts, Masahiko Ishiwaki et al., "Efficient Self-timed Queue Architecture for a shared-buffering ATM Switch", Institute of Electronics, Information and Communication Engineers of Japan, Integrated Circuit Study Group, ICD94-67, June 1994. The ATM switches in the preferred embodiments of the present invention preferably use the ATM switch described in this reference.

Figure 1:
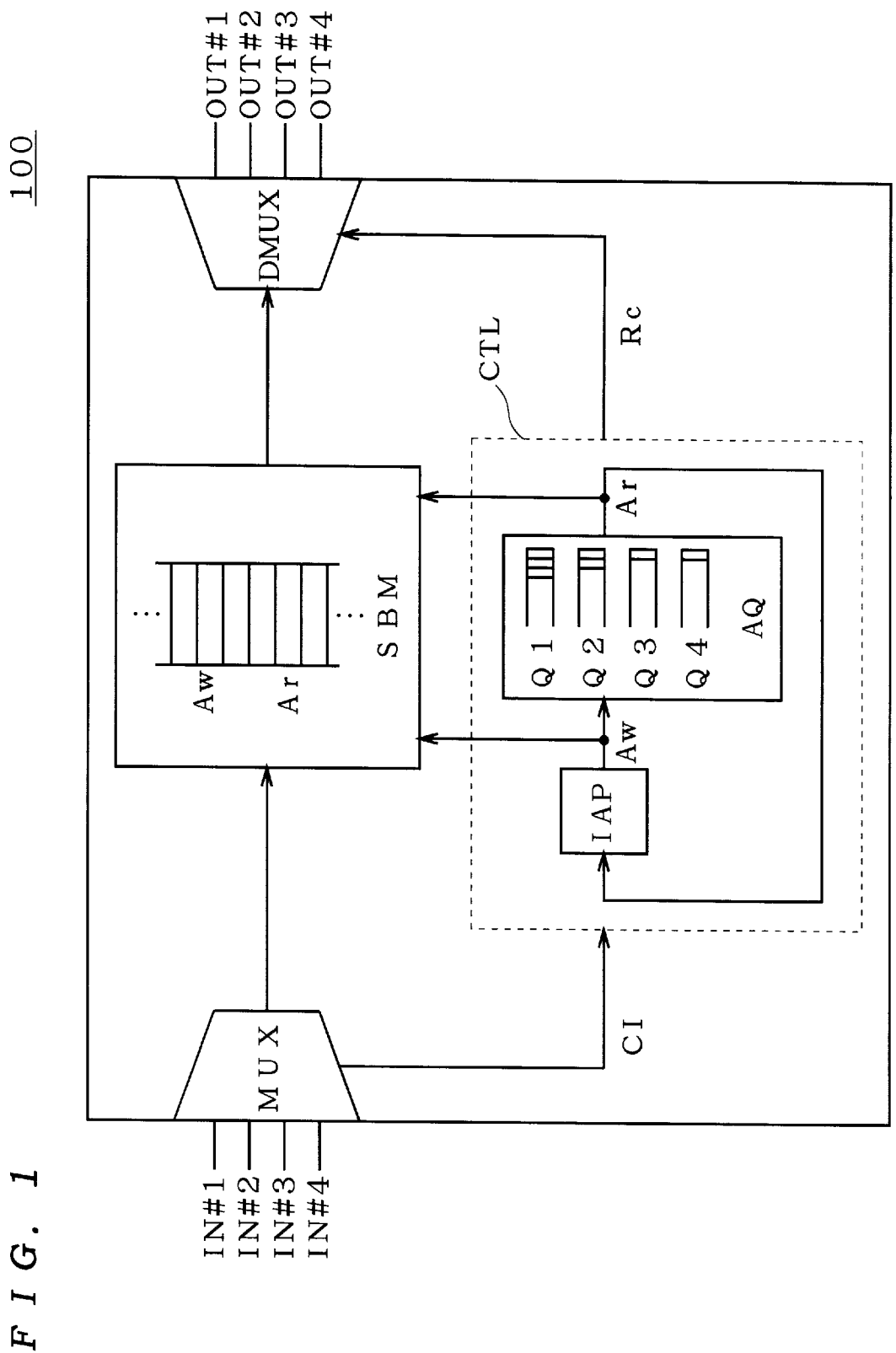
FIG. 1 is a diagram showing the concept of a network communication device, or an ATM switch 100, in preferred embodiments of the present invention.

FIG. 1 is a diagram showing the concept of an ATM switch 100 in a first preferred embodiment of the present invention. This ATM switch 100 includes a multiplexer MUX connected to a plurality of input lines IN#1–4, a demultiplexer DMUX connected to a plurality of output lines OUT#1–4, a shared buffer memory SBM (storage area) for storing a plurality of cells received from the plurality of input lines IN#1–4, and a control portion CTL (received packet managing means) for managing management data DATA corresponding to the plurality of received cells in a one-to-one manner. The control portion CTL includes an idle address pool IAP for managing free addresses in the shared buffer memory SBM, and an address queue AQ for managing the management data DATA including write addresses Aw for writing corresponding received cells into the shared buffer memory SBM, destinations and cell identification information CI for each of the output lines OUT#1–4. The cell identification information CI forms a part or the entirety of information in the header portion of the received cell.

The cell identification information CI includes a tag for identifying a call relating to the corresponding received cell and the destination. In this preferred embodiment, at least one of VPI (Virtual Path Identifier) and VCI (Virtual Channel Identifier) contained in the header portion of the received cell is used as the tag. The VPI and VCI are called "identifiers." The identifiers are set for each call.

The destination indicates at least one output line. Accordingly, depending on the destination, a cell transferred from a certain input line may be transmitted to one output line, or may be transmitted to a plurality of output lines. The operation of transmitting to a plurality of output lines is called "multi-cast."

A network communication device, such as the ATM switch, may send a plurality of cells (data stream) having identifiers with different contents to the same output line. For example, another ATM switch connected to the other end of the output line may send the cells to different output lines. Thus, even if a plurality of cells are transferred to the same output line, they do not always belong to the same call.

Figure 2:
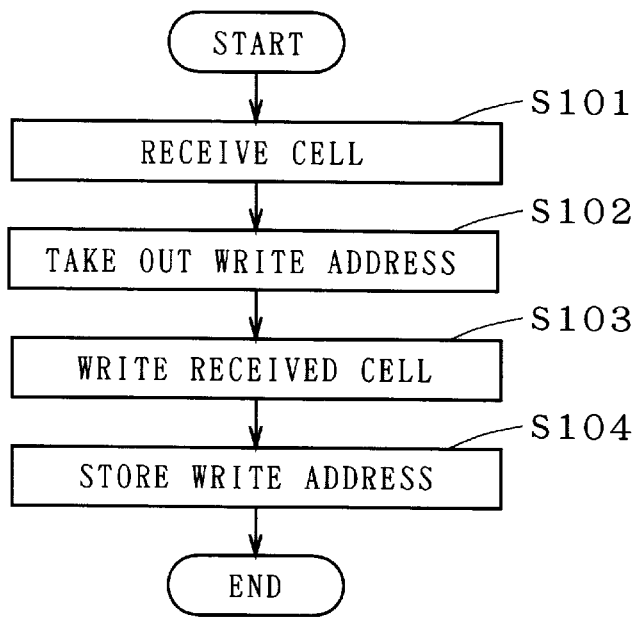
FIG. 2 is a flowchart showing the operation of receiving a cell of the ATM switch 100 of a first preferred embodiment of the present invention.

FIG. 2 shows an operation of the ATM switch 100 when receiving a cell. First, the ATM switch 100 receives one cell as a received cell at the multiplexer MUX from a certain input line (step S101).

Next, the control portion CTL takes out one free address managed in the idle address pool IAP as a write address Aw (step S102).

Next, the multiplexer MUX outputs the received cell to the shared buffer memory SBM at a speed four (the number of input lines) times the line speed, which is written into the write address Aw in the shared buffer memory SBM (step S103).

Next, the control portion CTL distinguishes the management data DATA of the received cell into a queue according to the output line indicated by the destination of the cell. The queues Q1–Q4 correspond to the output lines OUT#1–4, respectively. The destination of the received cell may indicate a plurality of output lines, as in the case of a multi-cast cell. In this case, the management data DATA with the same contents is included into the queues corresponding to the plurality of output lines. At this time, since the write address Aw has been extracted out of the idle address pool IAP, it does not exist in the idle address pool IAP (step S104).

By repeating steps S101–S104, a plurality of cells received from the input lines IN#1–4 are once stored in their respective write addresses Aw in the shared buffer memory SBM. The plurality of management data DATA forming the queues are arranged in the order in which the cells were received in step S101.

Figure 3:
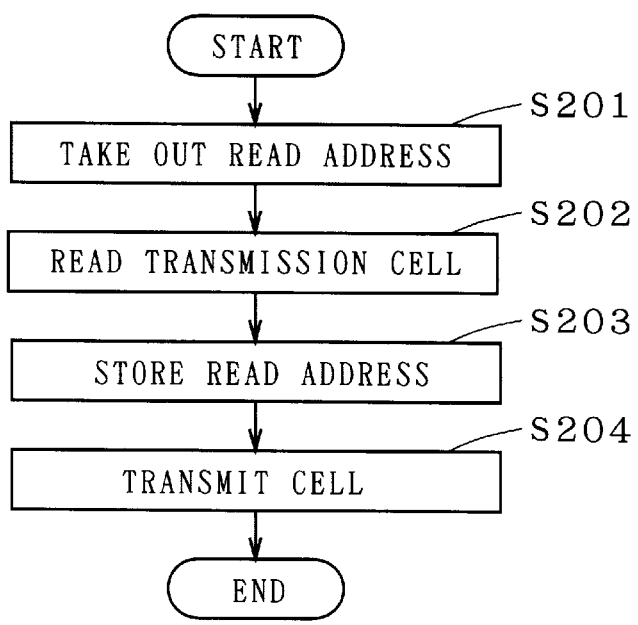
FIG. 3 is a flowchart showing the operation of sending a cell of the ATM switch 100 in the first preferred embodiment of the present invention.

FIG. 3 shows operation of the ATM switch 100 for transferring received cells. First, in the FIFO (First In First Out) order, the control portion CTL takes out the one received earliest from among the write addresses Aw in the queue corresponding to a free output line as the read address Ar (step S201).

Next, the shared buffer memory SBM reads the received cell written in the read address Ar taken out in step S201 as a transmitted cell (step S202).

As has been described in step S104, when the destination of the received cell indicates a plurality of output lines, the write address Aw with the same contents is stored in a plurality of queues. Accordingly, even if one read address Ar is taken out in step S201, the read address Ar may still exist in the address queue AQ. Hence, the control portion CTL stores the read address Ar as a free address into the idle address pool IAP when no address Ar exists in the address queue AQ (step S203).

Next, the demultiplexer DMUX sends the transmitted cell to the free output line indicated by a read control signal Rc (step S204).

The steps S201–S204 are repeated to transfer the plurality of received cells stored in the shared buffer memory SBM to the output lines according to the destinations. The ATM switch 100 can transmit the cells in the order of reception by taking out the write addresses Ar in the queues in the order of reception.

Figure 4:
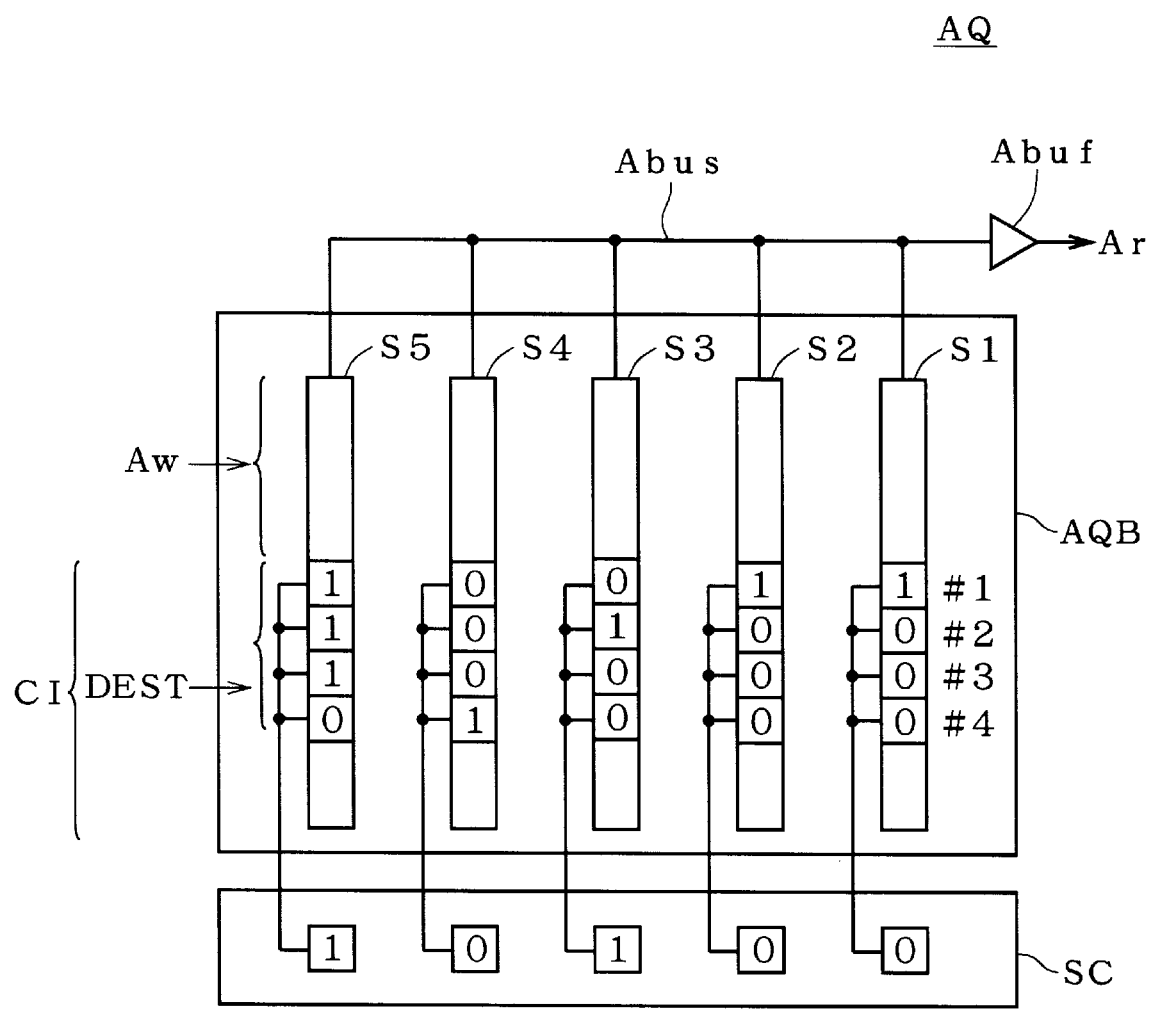
FIG. 4 is a block diagram showing a more specific structure of the address queue AQ.

FIG. 4 shows a more specific example of the concept of the address queue AQ. The address queue AQ includes an address queue body AQB (management data storing means) including stages S1–S5 connected in series, which is a self-synchronizing shift circuit for storing the management data into the stages S1–S5 in the order of reception from the preceding stages to the following stages, a search circuit SC for searching the stages, an address bus Abus for transferring the write address Aw from the address queue body AQB, and an address buffer Abuf connected to the address bus Abus for outputting the write address Aw as the read address Ar. Although FIG. 4 shows five stages for simplicity, it is necessary that the number of the stages is at least larger than the number of addresses of the buffer.

The destination includes destination bits corresponding to the output lines OUT#1–4. When a destination bit in a certain stage is "1," it means that the received cell written in the write address Aw in this stage is transmitted to the output line corresponding to this destination bit.

Figure 5:
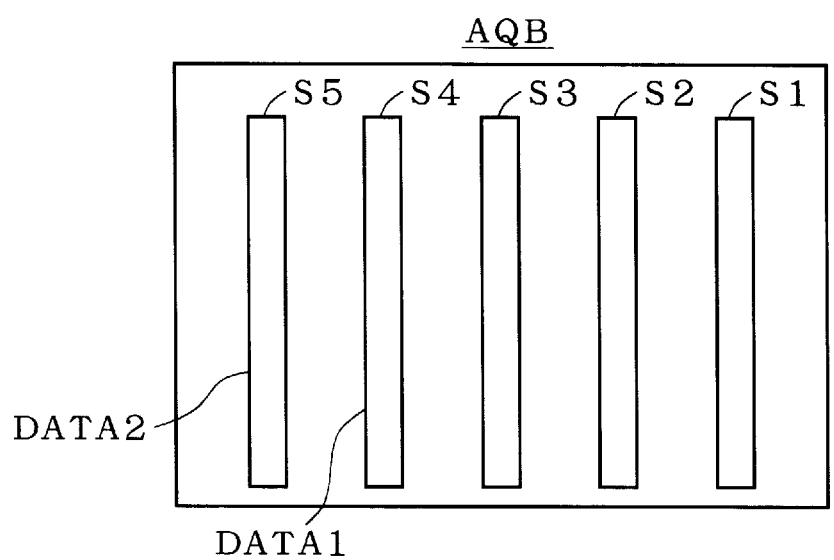
FIG. 5 is a diagram for explaining operation of the address queue AQ.
Figure 6:
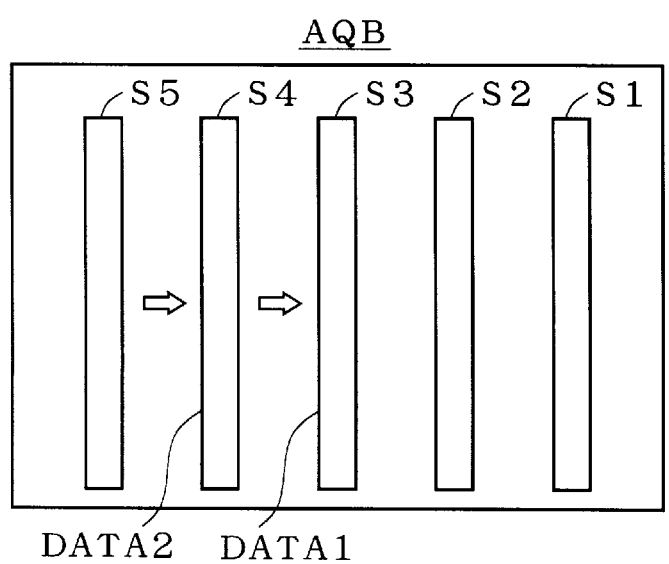
FIG. 6 is a diagram for explaining the operation of the address queue AQ.

The address queue body AQB operates as follows. The last stage S5 receives the management data DATA in the order of reception and the management data DATA can be shifted from the following stage to the preceding stage. For example, when the management data DATA1 is stored in the stage S4 and the management data DATA2 is stored in the stage S5 as shown in FIG. 5, the management data DATA1 stored in the stage S4 can be shifted to the stage S3 and the management data DATA2 stored in the stage S5 can be shifted to the stage S4, as shown in FIG. 6. Thus, the management data DATA are stored in the order of reception in the stage S1 to the stage S5. Further, invalid management data DATA stored in a preceding stage can be erased by overwriting valid management data DATA in the following stage into the preceding stage.

Figure 7:
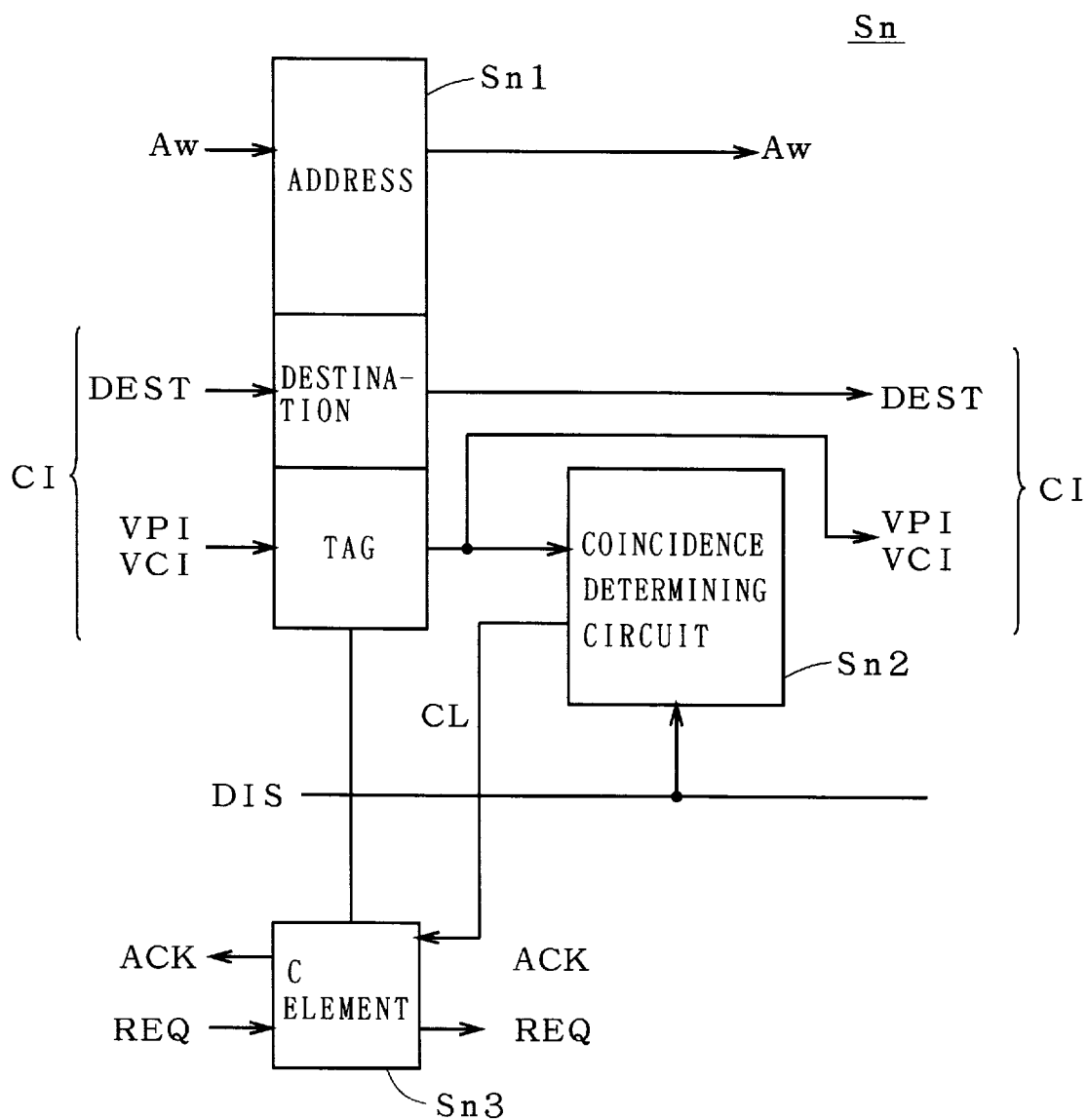
FIG. 7 is a diagram showing the internal structure of the stage Sn in the first preferred embodiment of the present invention.

FIG. 7 shows the internal structure of each stage Sn (n=1–5). Each stage Sn (n=1–N) includes a stage body Sn1, a coincidence detecting circuit Sn2 (packet managing detecting means) receiving discarding information DIS for discarding a cell and the tag, for detecting management data having the tag corresponding to the discarding information DIS, and a C element Sn3 (management data overwriting means) for shifting management data into a stage containing the management data detected by the coincidence detecting circuit Sn2, or into a stage containing management data with an invalid destination, from the following stage. The C element Sn3 also controls data shift in normal operation, as well as in the discarding operation.

Figure 8:
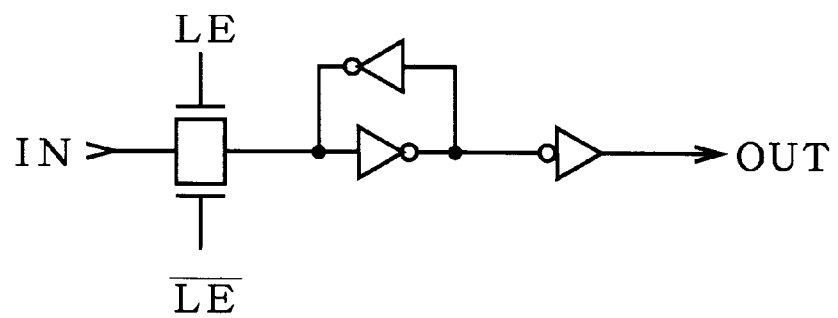
FIG. 8 is a diagram showing part of the internal structure of the stage body Sn1.

The stage body Sn1 stores the management data DATA. The internal structure of the stage body Sn1 is mainly formed of the same number of registers shown in FIG. 8 as the number of the bits forming the write address Aw and the cell identification information CI. IN is connected to the following stage and OUT is connected to the preceding stage.

Figure 9:
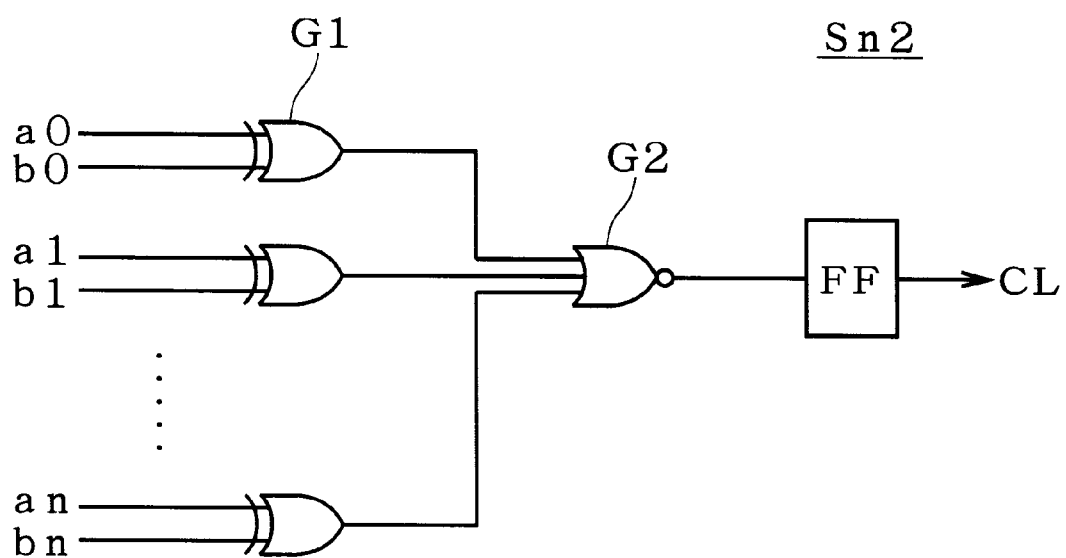
FIG. 9 is a diagram showing the internal structure of the coincidence detecting circuit Sn2.

The coincidence detecting circuit Sn2 outputs a coincidence signal CL when the tag stored in the stage body Sn1 coincides with the discarding information DIS. The discarding information DIS and the tag are formed of the same number of bits. FIG. 9 shows the internal structure of the coincidence detecting circuit Sn2. The bits a0–an form the discarding information DIS and the bits b0–bn form the tag. The character G1 indicates exclusive OR circuits, G2 indicates a NOR circuit, and FF indicates a flip-flop circuit which latches the coincidence signal and outputs it when receiving a timing signal not shown. The flip-flop circuit FF can be omitted.

The C element Sn3 performs shake-hand transfer. When the coincidence signal CL is received in the stage Sn, it means that the cell data corresponding to the write address Aw in the stage Sn is discarded. When all of the destination bits are "0," it means that the cell data corresponding to the write address Aw in the stage Sn has already been transferred to the output line. That is to say, when the stage Sn is receiving the coincidence signal or when all destination bits are "0," the management data DATA in the stage body Sn1 is invalid. Thus invalidating the management data DATA in the stage Sn is referred to as "clear the stage Sn." If the C element Sn3 receives a request signal REQ from the following stage with the stage Sn cleared, it stores the management data DATA stored in the following stage and then outputs an acknowledge signal ACK to the following stage. On the other hand, if the C element Sn3 receives the request signal REQ from the following stage when the stage Sn is not cleared, it outputs the request signal REQ to the preceding stage. When receiving the acknowledge signal ACK from the preceding stage, the C element Sn3 stores the management data DATA stored in the following stage and then outputs the acknowledge signal ACK to the following stage. This shake-hand transfer enables shift in the address queue body AQB and erasing of invalid management data DATA.

Figure 10:
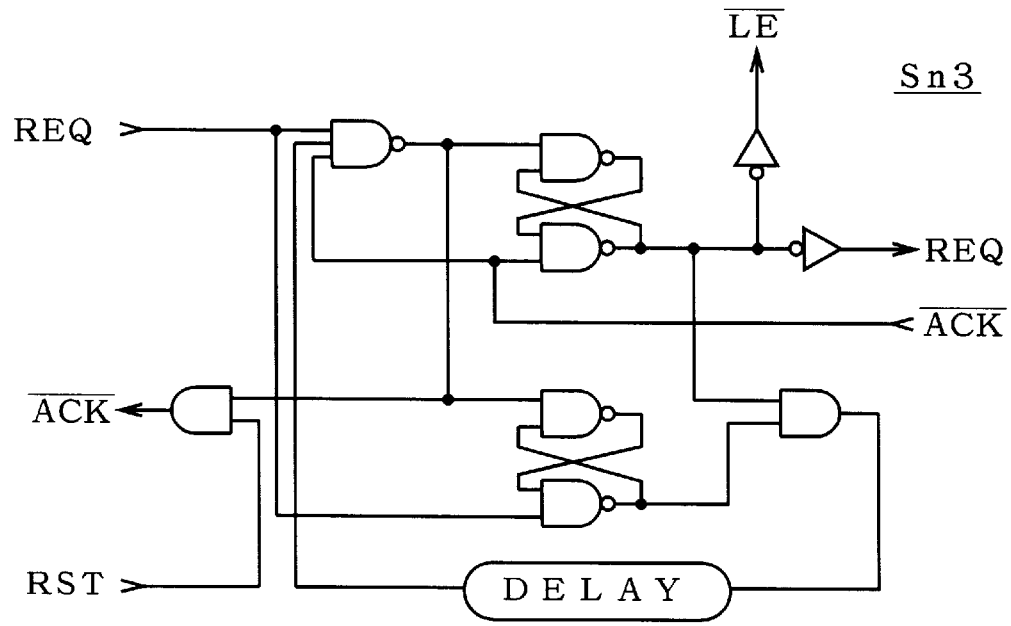
FIG. 10 is a diagram showing the internal structure of the stage body Sn1.
Figure 11:
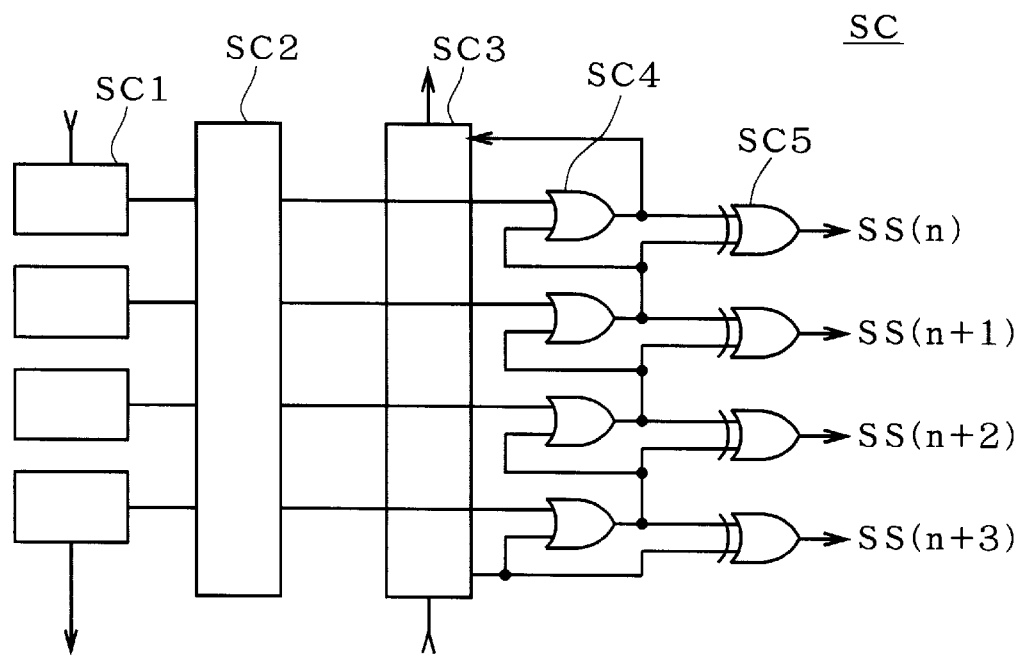
FIG. 11 is a diagram showing the internal structure of the search circuit SC.

FIG. 10 shows an example of the internal structure of the C element Sn3. In FIG. 10, a reset RST is generated by the control portion CTL. The structure in FIG. 10 is fully described in the above-cited reference. FIG. 11 shows an example of the internal structure of the search circuit SC. The character SC1 indicates storage portions for storing the destination bits, SC2 denotes a filter, SC3 denotes a look-ahead circuit for speeding up the searching operation, SC4 denotes OR circuits, SC5 denotes exclusive OR circuits, and SS(n)–SS(n+3) denote the stage select signal. The structure in FIG. 11 is fully described in the reference cited above.

Figure 12:
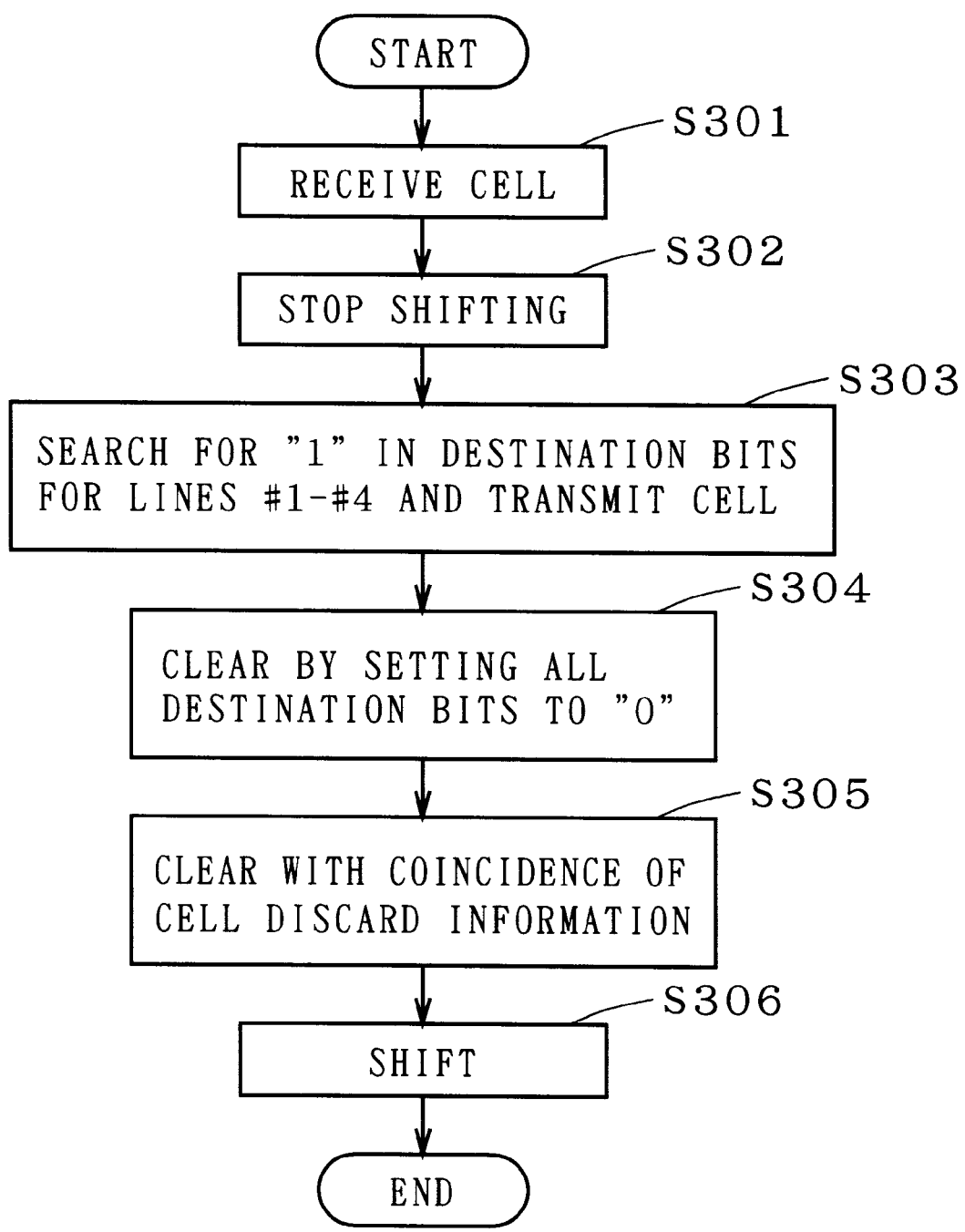
FIG. 12 is a flowchart showing the operation of the control portion CTL in the first preferred embodiment of the present invention.

FIG. 12 shows the operation of the control portion CTL in one ATM cell period in this preferred embodiment. One ATM cell period is the period required to receive one cell from one input line. Similarly to the conventional one, it is assumed that the discarding information was issued outside of the ATM switch 100 and the ATM switch 100 received the discarding information.

First, the ATM switch 100 receives a cell from at least one of the input lines IN#1–4. In the ATM switch 100, the management data DATA is transferred at a speed four times the line speed. In the address queue body AQB, the stage S5 receives at least one management data DATA in the order of reception in one ATM cell period and performs the shift operation (step S301).

Next, when the at least one management data DATA is stored in the address queue body AQB, the shift operation is stopped (step S302).

Next, the following operations are performed in the order of the output lines OUT#1–4. That is to say, the address queue body AQB receives an output line specifying signal (not shown) for specifying the output line OUT#1 from the control portion CTL. In the stages S1–S5 in the address queue body AQB, if the contents of the destination bit corresponding to the output line OUT#1 specified by the output line specifying signal coincide with the output line OUT#1, "1" is outputted. If they do not coincide, "0" is outputted to the search circuit SC. The signal to the search circuit SC is referred to as a coincidence check result, hereinafter. Among the coincidence check results from the stages S1–S5, the search circuit SC detects a stage providing "1" first, in the order from the preceding stage to the following stage. The search circuit SC outputs the stage select signal to the detected stage. When the stage receives the stage select signal, it outputs the write address Aw stored in itself onto the address bus Abus. The address buffer Abuf outputs the write address Aw from the address bus Abus as the read address Ar. Then the stage body Sn1 sets the destination #1 bit to "0." This operation is performed for the output lines OUT#2–4, as well (step S303).

It is assumed that all destination bits are set to "0" in step S303 in a certain stage Sn, that is, a certain stage Sn is cleared (step S304).

Next, the control portion CTL outputs the discarding information DIS to the coincidence detecting circuit Sn2. The coincidence detecting circuit Sn2 in the stage containing the tag, stored in the stage body Sn1, corresponding to the discarding information DIS outputs the coincidence signal CL. Then the C element Sn3 receives the coincidence signal CL and the stage Sn is cleared. When there are a plurality of kinds of discarding information DIS, the control portion CTL sequentially outputs the discarding information DIS to the coincidence detecting circuit Sn2 (step S305).

Next, the control portion CTL outputs the request signal REQ to the stage S5 to shift the management data DATA so that the invalid management data DATA in the cleared stage Sn is erased (step S306).

This way, in each ATM cell period, the discarding information DIS corresponding to the number of the kinds are outputted, and then the management data DATA corresponding to the discarding information DIS are erased in step S306. The control portion CTL discards the management data DATA corresponding to the discarding information DIS detected by the coincidence detecting circuit Sn2.

This preferred embodiment provides the following effect. Among the received cells stored in the shared buffer memory SBM, those corresponding to the discarded management data DATA are excluded from the objects of read. Accordingly, virtually, the control portion CIL can discard the received cells corresponding to the discarding information, and can immediately discard the invalid cells in the shared buffer memory SBM. As the tags for identifying the cell data, identifiers in the cell header portions can be intactly utilized.

Second Preferred Embodiment

Figure 13:
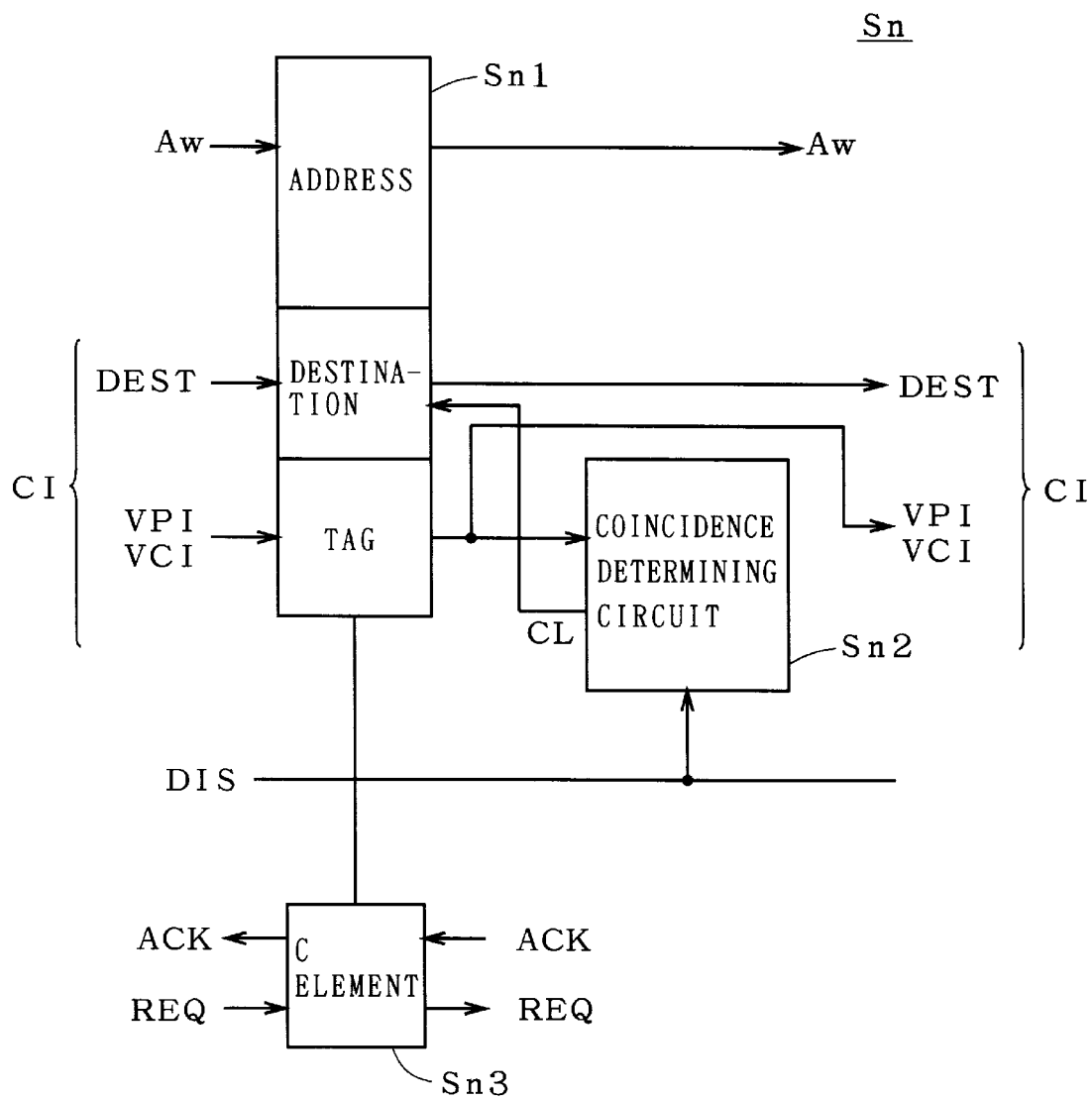
FIG. 13 is a diagram showing the internal structure of the stage Sn in a second preferred embodiment of the present invention.

FIG. 13 is a diagram showing the internal structure of the stage Sn in a second preferred embodiment of the present invention. The coincidence detecting circuit Sn2 in the first preferred embodiment outputs the signal CL to the C element Sn3. However, the coincidence detecting circuit Sn2 in the second preferred embodiment outputs the signal CL to the stage body Sn1. The stage body Sn1 sets all destination bits to "0" when receiving the signal CL. The structure is the same as that of the first preferred embodiment in other respects.

Figure 14:
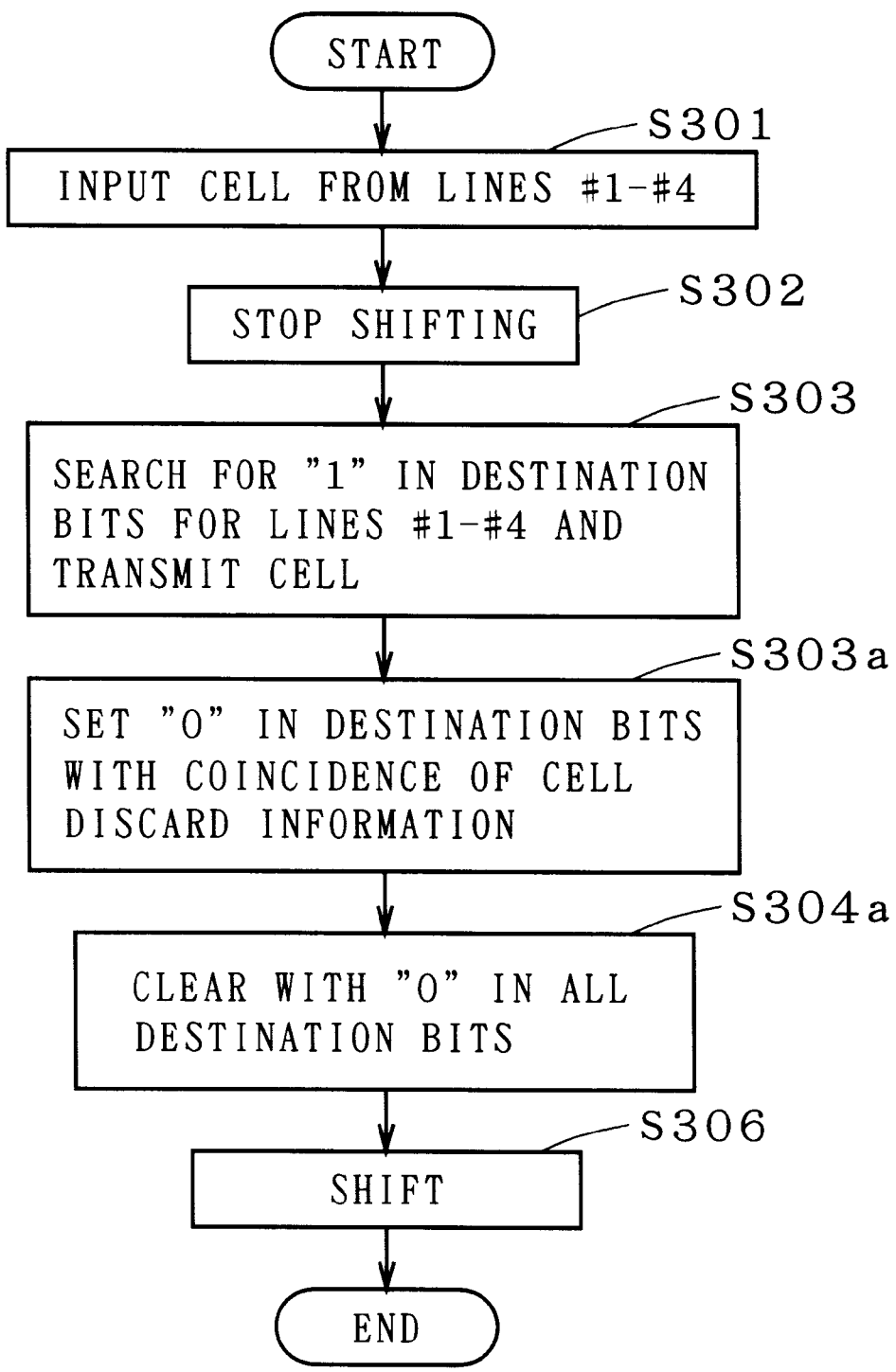
FIG. 14 is a flowchart showing the operation of the control portion CTL in the second preferred embodiment of the present invention.

FIG. 14 shows the operation of the control portion CTL in one ATM cell period in this preferred embodiment. First, steps S301–S303 are conducted similarly to the first preferred embodiment.

Next, the control portion CTL outputs the discarding information DIS to the coincidence detecting circuit Sn2. The coincidence detecting circuit Sn2 in the stage containing the tag, stored in the stage body Sn1, corresponding to the discarding information DIS outputs the coincidence signal CL. Then the stage body Sn1 receives the coincidence signal CL and sets all destination bits to "0." When there are a plurality of kinds of discarding information DIS, the control portion CTL sequentially outputs the discarding information DIS to the coincidence detecting circuit Sn2 (step S303a).

In some of the stages Sn, all destination bits are set to "0" in steps S303 and step S303a, that is, the stages are cleared (step S304a). The stages cleared in step S304a in this preferred embodiment correspond to those cleared in steps S304 and S305 in the first preferred embodiment.

Next, similarly to the first preferred embodiment, step S306 is conducted.

This preferred embodiment provides the following effect. When the stage body Sn1 receives the signal CL in step S303a, all destination bits are set to "0" to clear the stage Sn. Further, the hardware can be shared to set the destination bits to "0" in steps S303 and S303a.

Third Preferred Embodiment

The identifiers are used as the tags in the first and second preferred embodiments. In usual ATM switches, the number of combinations of bits in identifier which can be handled at the same time is limited by hardware conditions, such as the number of registers, and all combinations of bits in identifier are not actually handled.

For example, if the number of actually handled combinations of bits in identifier is 1024, the combinations can be represented with 10 bits. However, the number of bits in identifier defined by the international recommendation have bits over 10. When the number of bits in identifier have an unnecessarily larger number of bits, it increases the size of the hardware of the address queue AQ.

Figure 15:
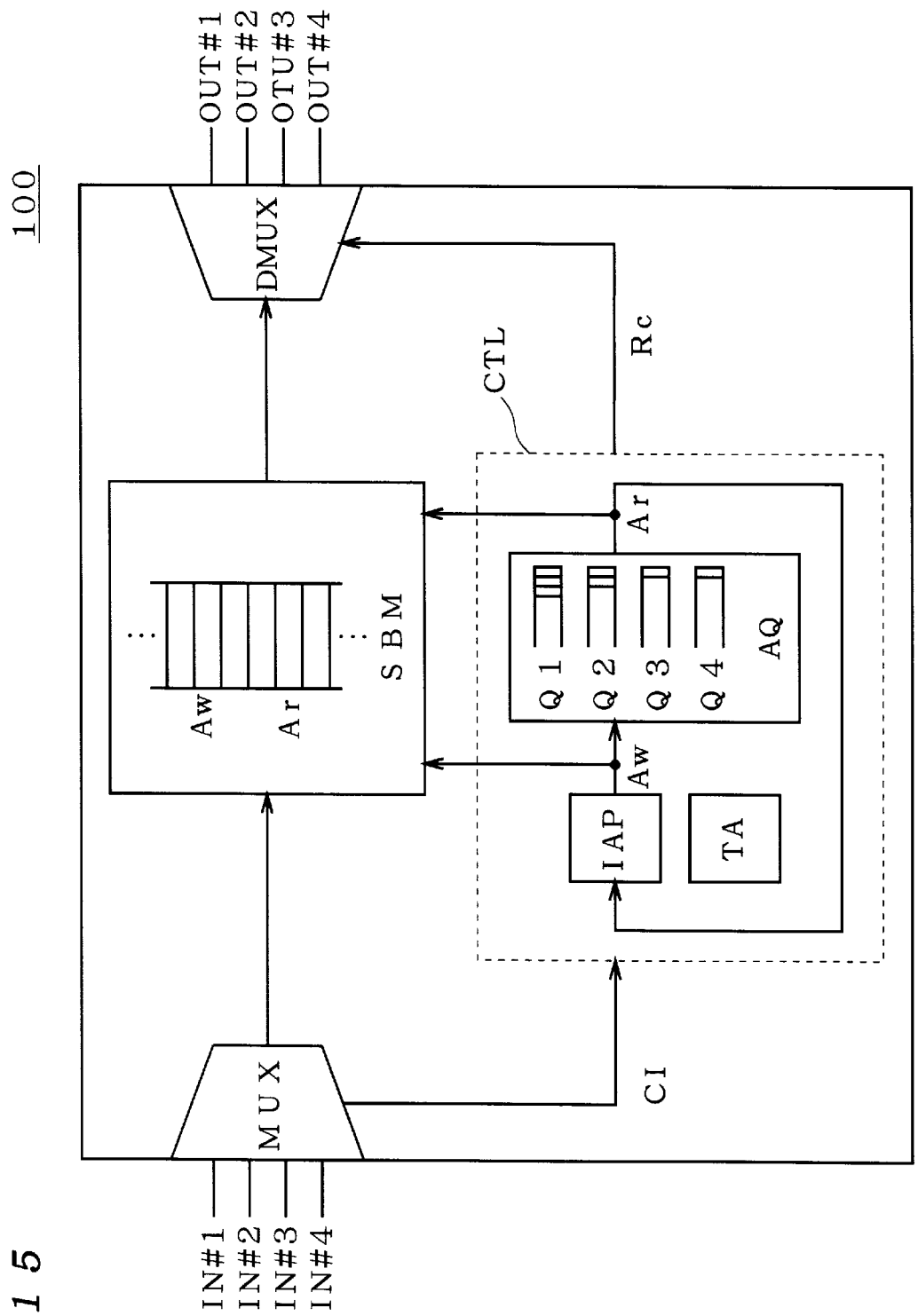
FIG. 15 is a diagram showing the concept of an ATM switch 100 in a third preferred embodiment of the present invention.

Accordingly, in this preferred embodiment, as shown FIG. 15, a translation table TA is provided, which receives the identifier formed of a plurality of bits and translates it into an entry signal formed of a smaller number of bits than the plurality of bits, and the entry signal is used as the tag. The entry signal has the minimum number of bits required to represent actually handled combinations of identifiers. For example, if the number of combinations of bits in identifier is 1024, the translation table TA receives the identifier and outputs the entry signals having 10 bits which correspond to the combinations of the identifiers in a one-to-one manner.

The stage body Sn1 in this preferred embodiment stores the entry signal in place of the identifier in the first and second preferred embodiments. The coincidence detecting circuit Sn2 in this preferred embodiment receives the discarding information DIS with the same number of bits which corresponds to the entry signal, instead of the discarding information DIS in the first and second preferred embodiments.

When a call is set, a combination of bits in identifier corresponding to the call is newly added. The translation table TA can enter the entry signal corresponding to the new combination every time a call is set.

The translation table TA may be included in the control portion CTL as shown in FIG. 15, or may be included in in-device interfaces in the multiplexer MUX and the demultiplexer DMUX.

When the translation table TA is included in the multiplexer MUX and the demultiplexer DMUX, the components operate as follows. The multiplexer MUX generates the entry signal, which is obtained as the identifier is processed through the translation table TA, and stores the entry signal in the portion for storing the identifier in the header. Then the stage body Sn1 stores only the entry signal stored in this portion. The demultiplexer DMUX passes the entry signal through the translation table TA to reconfigure it into the VPI and VCI.

Usually, the ATM switch replaces the identifiers of the received cells when transmitting the cells. Accordingly, when the translation table TA is formed by utilizing the hardware for replacing the identifiers in the ATM switch, forming the translation table introduces no overhead.

This preferred embodiment provides the following effect. The translation table TA enables size reduction of the hardware of the address queue AQ.

Fourth Preferred Embodiment

Only the received cells corresponding to the discarding information DIS are discarded in the first to third preferred embodiments. However, the fourth preferred embodiment has, in addition to the features of any of the first to third preferred embodiments, the feature that the received cells are also discarded according to the discarding priority included in the header portions of the received cells. The discarding priority indicates levels at which discard of the cells is allowed, which is set according to the degree of importance of the cells. This is a concept existing particularly in the technical field of the ATM switches and the like. This discarding priority is applied to such low-priced calls as use cell data with limited reliability without guarantee of quality, which can be identified with the header portions of the cells allocated to the calls when the calls are set.

FIG. 16 shows an internal structure of the stage Sn in this preferred embodiment. FIG. 16 shows an application of the feature of this preferred embodiment to the second preferred embodiment. The stage Sn of this preferred embodiment additionally includes a coincidence detecting circuit Sn2a. The cell identification information CI includes the discarding priority. The discarding priority is included in the tag. The coincidence detecting circuit Sn2a has the same internal configuration as the coincidence detecting circuit Sn2. It outputs the coincidence signal CL when the discarding priority stored in the stage body Sn1 corresponds to discarding information for the discarding priority, DISa. The logic circuit G3 outputs OR of the coincidence signals CL outputted from the coincidence detecting circuit Sn2 and the coincidence detecting circuit Sn2a to the stage body Sn1. The structure is the same as that of the second preferred embodiment in other respects.

Figure 17:
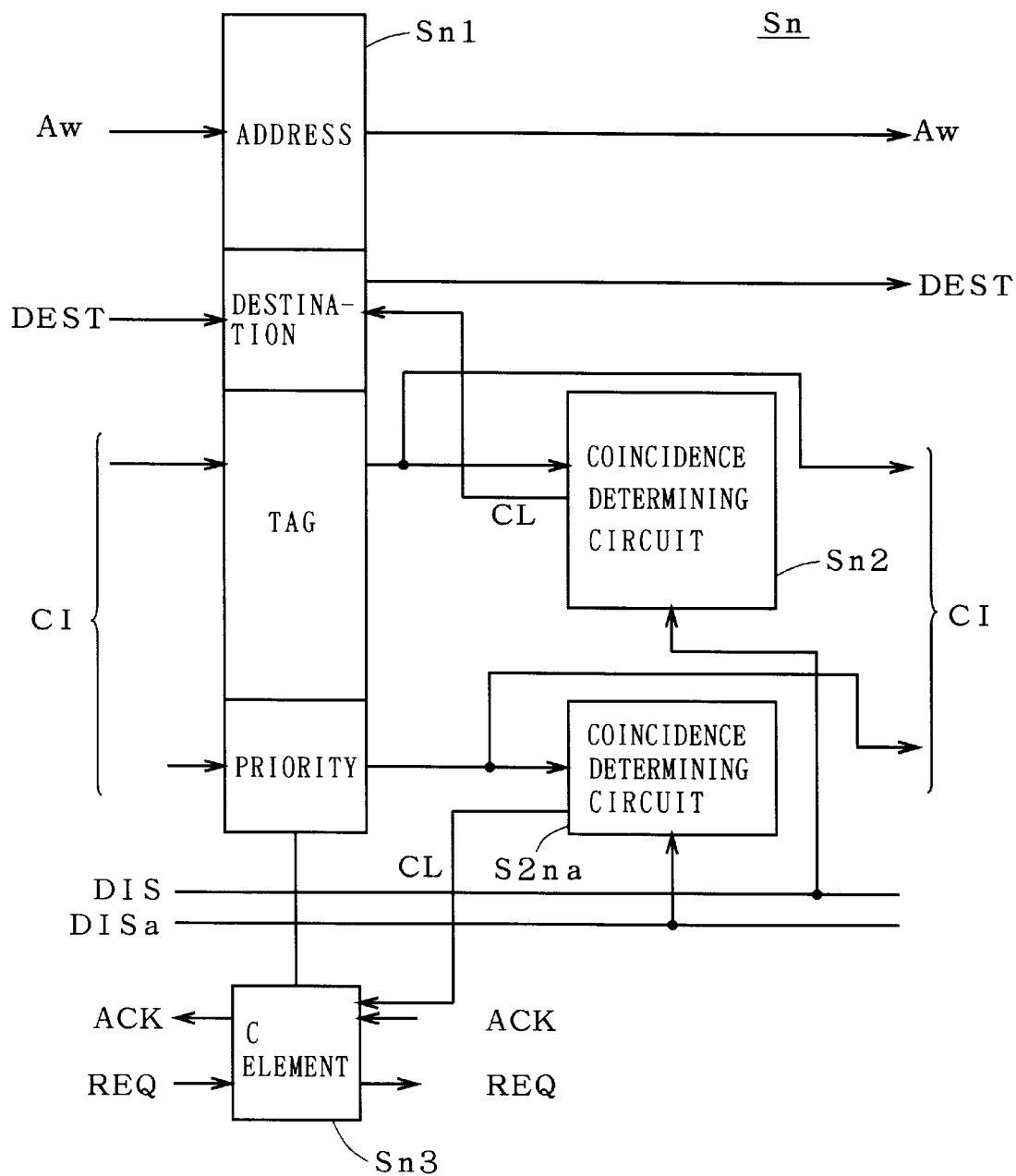
FIG. 17 is a diagram showing another internal structure the stage Sn in the fourth preferred embodiment of the present invention.

As another example of structure of this preferred embodiment, the coincidence signal CL from the logic circuit G3 in FIG. 16 may be outputted, not to the stage body Sn1, but to the C element Sn3. Or, as shown in FIG. 17, the coincidence detecting signal CL from the coincidence detecting circuit Sn2 may be outputted to the stage body Sn1 and the coincidence detecting signal CL from the coincidence detecting circuit Sn2a to the C element Sn3. Alternatively, the coincidence detecting signal CL from the coincidence detecting circuit Sn2a may be outputted to the stage body Sn1 and the coincidence detecting signal CL from the coincidence detecting circuit Sn2 to the C element Sn3.

Figure 18:
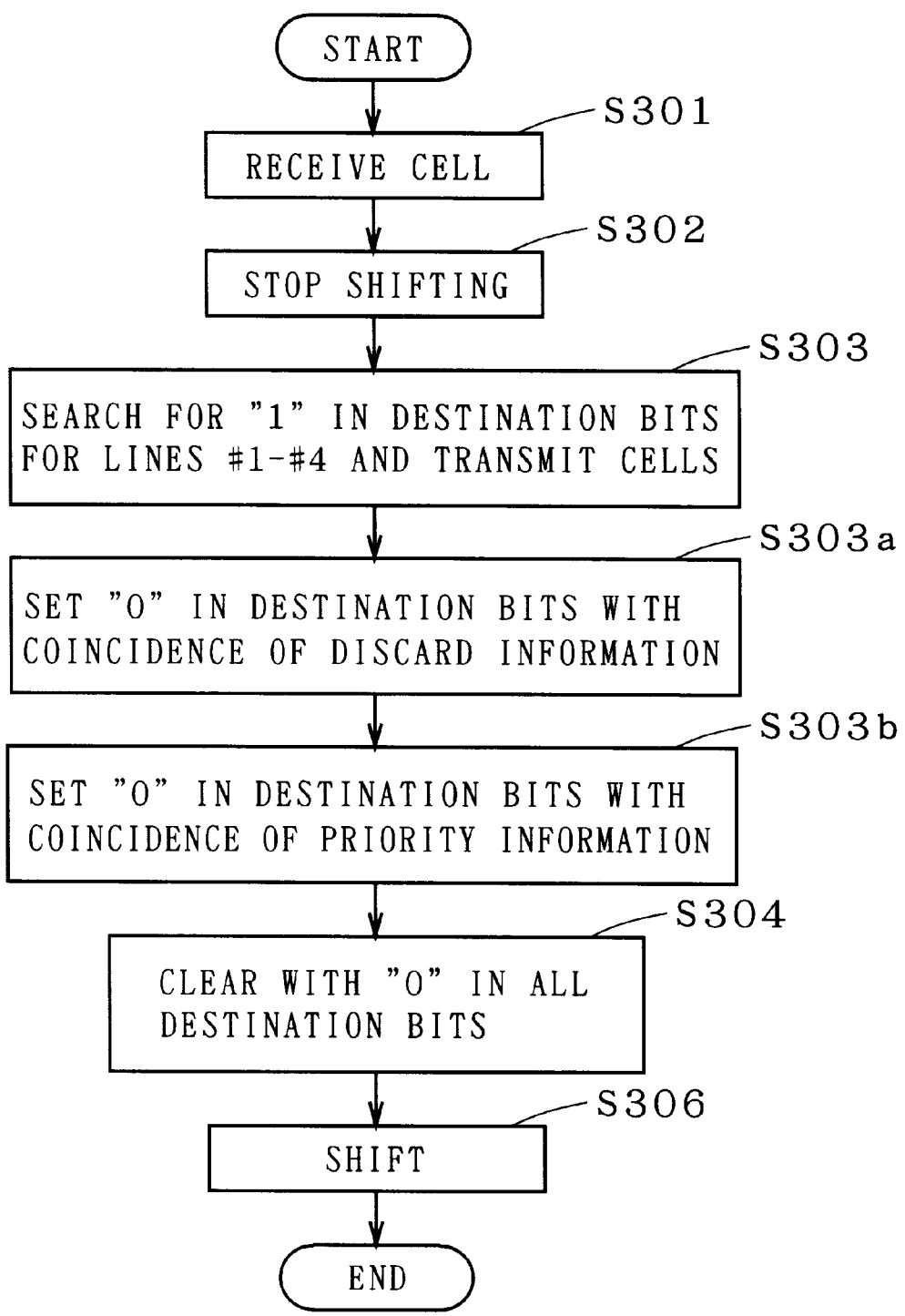
FIG. 18 is a flowchart showing the operation of the control portion CIL in the fourth preferred embodiment of the present invention.

FIG. 18 shows the operation of the control portion CTL in one ATM cell period in the application of the feature of this preferred embodiment to the second preferred embodiment. First, steps S301–S303a are conducted similarly to the second preferred embodiment.

Next, the control portion CTL outputs the discarding information DISa to the coincidence detecting circuit Sn2a. The coincidence detecting circuit Sn2a in a stage containing the discarding priority, stored in the stage body Sn1, corresponding to the discarding information DISa outputs the coincidence signal CL. Then the stage body Sn1 receives the coincidence signal CL and sets all destination bits to "0." When there are plural kinds of discarding information DISa, the control portion CTL sequentially outputs the discarding information DISa to the coincidence detecting circuit Sn2 (step S303b).

In some of the stages Sn, all destination bits are set to "0" in steps S303–S303b. That is to say, some of them are cleared (step S304).

Next, step S306 is conducted similarly to the second preferred embodiment.

This preferred embodiment provides the following effect. When there is little free area in the shared buffer memory SBM, the discarding information DISa is outputted to instantly discard cells in the shared buffer memory SBM, and then free area is ensured in the shared buffer memory SBM at once.

Fifth Preferred Embodiment

In the network communication devices such as the ATM switch, there is a demand for statistically grasping the number of discarded cells or cell data. This is due to the fact that the number of cells discarded with the discarding information may be required in management of the network. In addition to the features of any of the first to fourth preferred embodiments, the fifth preferred embodiment has a feature that the number of discarded cells can be grasped by utilizing the coincidence signal CL.

Figure 19:
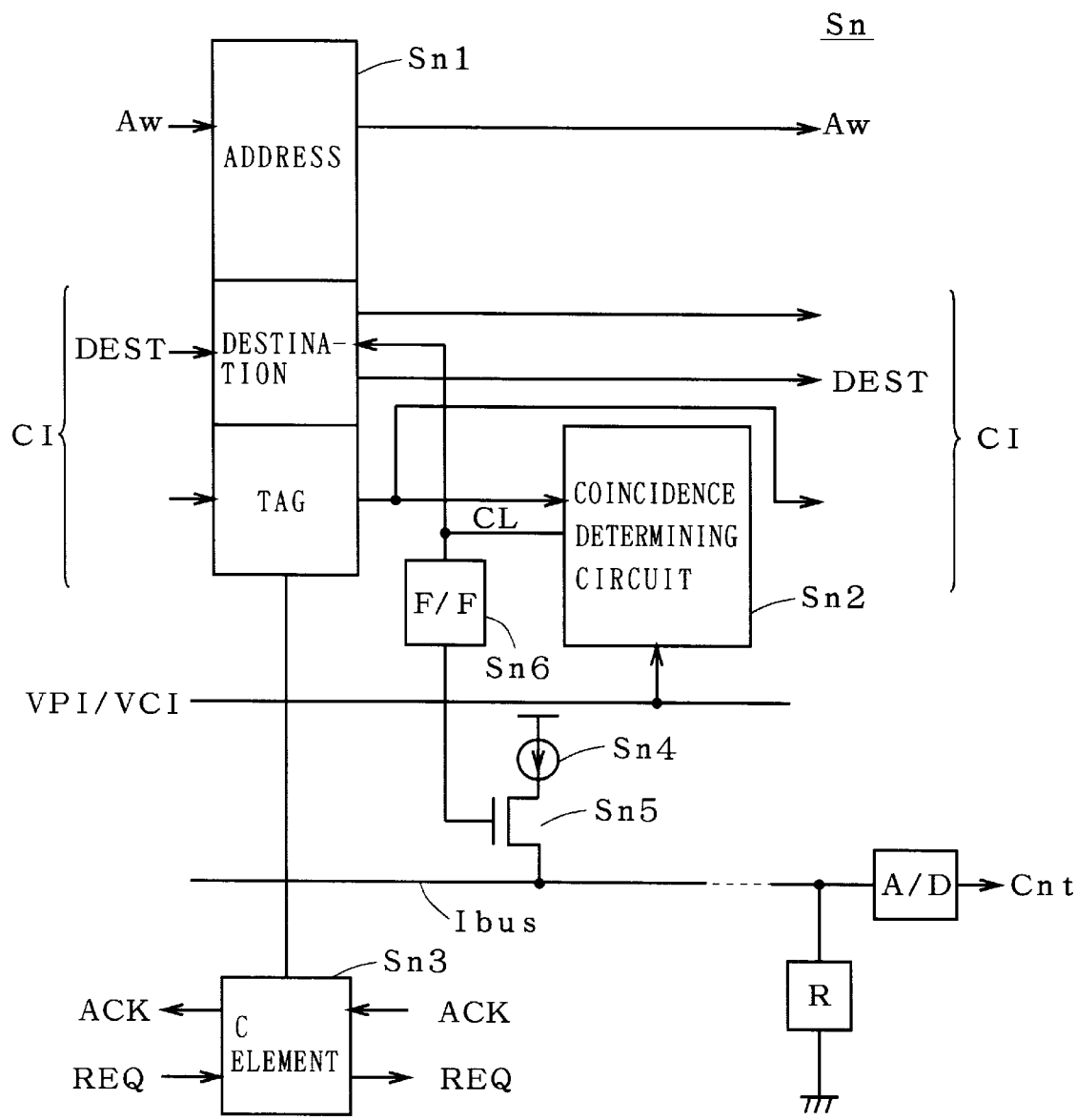
FIG. 19 is a diagram showing the internal structure of the stage Sn in a fifth preferred embodiment of the present invention.

FIG. 19 shows an internal configuration of the stage Sn in this preferred embodiment. FIG. 19 shows an application of the feature of this preferred embodiment to the second preferred embodiment. The stage Sn of this preferred embodiment further includes a constant-current source Sn4, an NMOS transistor Sn5, and a flip-flop circuit Sn6.

The control portion CTL further includes a current bus Ibus receiving constant current from a plurality of constant-current sources Sn4, a resistor R, and an analog-digital converter A/D and a resistor R for analog-digital converting the current on the current bus Ibus to produce a result of totalization of the coincidence signals CL (detected results) of the coincidence detecting circuits Sn2. The constant-current sources Sn4, the NMOS transistors Sn5, the flip-flop circuits Sn6, the current bus Ibus, the analog-digital converter A/D and the resistor R form discarded number detecting means for totalizing the detected results of the coincidence detecting circuits Sn2. The flip-flop circuit Sn6 stores the coincidence signal CL and outputs it to the gate electrode of the NMOS transistor Sn5. The constant-current source Sn4 is connected to the current bus Ibus through the NMOS transistor Sn5. The current bus is connected to a fixed potential such as ground through the resistor R. The analog-digital converter A/D receives the voltage at the resistor R.

Next, the operation of the discarded number detecting means will be described. When the flip-flop circuit Sn6 latches the coincidence signal CL, it outputs a signal at a "1" level to the gate electrode of the NMOS transistor Sn5. When receiving the "1" level signal at the gate electrode, the NMOS transistor Sn5 connects the output of the constant-current source Sn4 and the current bus Ibus. Thus the constant-current source Sn4 applies a constant current to the current bus Ibus when the coincidence detecting circuit Sn2 detects management data DATA having a tag corresponding to the discarding information DIS. Then the constant current flows to the fixed potential through the resistor R. Accordingly, at both ends of the resistor R, a voltage occurs in proportion to the number of coincidence signals CL produced in the stages Sn, or the number of stages Sn cleared with the discarding information. The analog-digital converter A/D receives the voltage across the ends of the resistor R and outputs the number of the coincidence signals CL from the voltage as a count value Cnt. This count value Cnt indicates the number of cells discarded in one ATM cell period.

In obtaining the count value Cnt for each ATM cell period, the precision of the analog-digital converter A/D becomes an issue, but precision of about 10 bits can be obtained with the current semiconductor integrated circuit technology when it converts at low rate. For example, at a line speed of 622 MBps, a converting time for the analog-digital converter A/D of 700 nsec or larger can be obtained. Accordingly, with an analog-digital converter A/D having a converting rate of several megahertz, the count value Cnt can be obtained for each ATM cell period.

This preferred embodiment provides the following effect. Hardware for grasping the number of discarded cells can be easily structured by utilizing the coincidence signal CL.

Sixth Preferred Embodiment

When a cell is discarded with the coincidence signal CL in the address queue AQ, the idle address pool IAP described in the above-cited reference cannot recognize it. Accordingly, even if a cell is discarded with the coincidence signal CL in the address queue AQ and then the address becomes free, the address may not exist in the idle address pool IAP. This is equivalent to the state in which this address is in use, which is likely to cause overflow of the shared buffer memory SBM. Then cells from the input lines cannot be stored in the shared buffer memory SBM.

Figure 20:
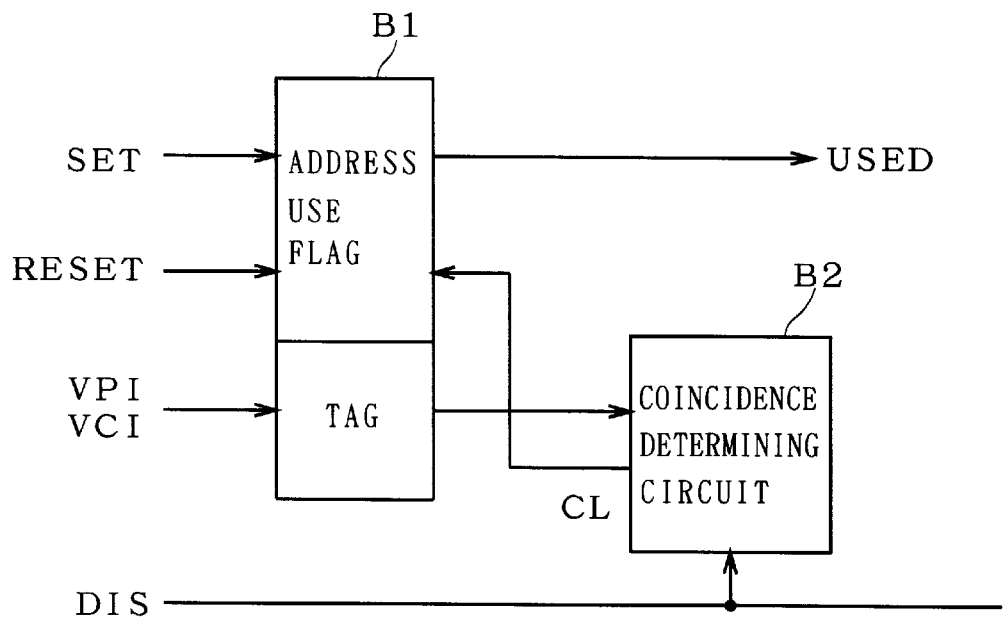
FIG. 20 is a diagram showing the internal structure of the idle address pool IAP in a sixth preferred embodiment of the present invention.

FIG. 20 shows an internal structure of the IAP of the sixth preferred embodiment. The IAP includes a plurality of flags corresponding to the plurality of addresses in the shared buffer memory SBM in a one-to-one manner for indicating whether the addresses are free or not, a plurality of tag storage portions for storing tags corresponding to the flags, and coincidence detecting circuits B2 (address managing detecting means) receiving the tags in the tag storage portions and the discarding information DIS for setting a flag corresponding to the B1 having the tag corresponding to the discarding information DIS as being free. The tag storage portion and the flag form the register B1. The register B1 is formed mainly by utilizing the registers shown in FIG. 8, similarly to the stage body Sn1.

The tags are the same as those applied to the stages Sn. The tags of this preferred embodiment use the identifiers. The coincidence detecting circuit B2 has the same internal structure as the coincidence detecting circuit Sn2. Although the reset signal RESET and the signal CL are outputted to the register B1 in FIG. 20, OR of the reset signal RESET and the signal CL may be outputted to the register B1.

First, it is assumed that all addresses are free, that is, all flags in the registers B1 are "0." When receiving one cell from a certain input line, one address is taken out from the idle address pool IAP (step S102 in FIG. 2). At this time, the idle address pool IAP outputs a set signal SET to the flag in the register B1 corresponding to this address to set the flag to "1," and also stores the identifier into the register B1. Next, when another cell is received from a certain input line and one address is taken out from the idle address pool IAP, an address having the smallest value is taken out from among the addresses corresponding to "0" flags.

When all destination bits have become "0" not with the coincidence signal CL in the address queue AQ but in the step S303 shown in FIG. 12 or the like, the idle address pool IAP outputs a reset signal RESET to the register B1 corresponding to the write address Aw stored in this stage to set the flag to "0."

In the idle address pool IAP, when a cell is discarded with the coincidence signal CL in the address queue AQ, the coincidence detecting circuit B2 whose register B1 contains the tag corresponding to the discarding information DIS outputs the coincidence signal CL. Then the register B1 receives the coincidence signal CL and sets the flag to "0," and thus the address of the cell discarded by the coincidence signal CL in the address queue AQ exists in the idle address pool IAP.

The idle address pool IAP is similarly formed in the case where the cells are discarded with the discarding priority, as in the fourth preferred embodiment. That is to say, the discarding priority, too, is included in the tag in the register B1, and a coincidence detecting circuit for the discarding priority, corresponding to the coincidence detecting circuit Sn2a, is further provided. The flag is set to "0" or "1" depending on the coincidence signal outputted from the discarding priority coincidence detecting circuit.

This preferred embodiment provides the following effect. When a cell is discarded with the coincidence signal CL in the address queue AQ, the idle address pool IAP in this preferred embodiment can recognize it, and places the address of the cell into the idle address pool IAP. This prevents overflow of the buffer.

Seventh Preferred Embodiment

Figure 21:
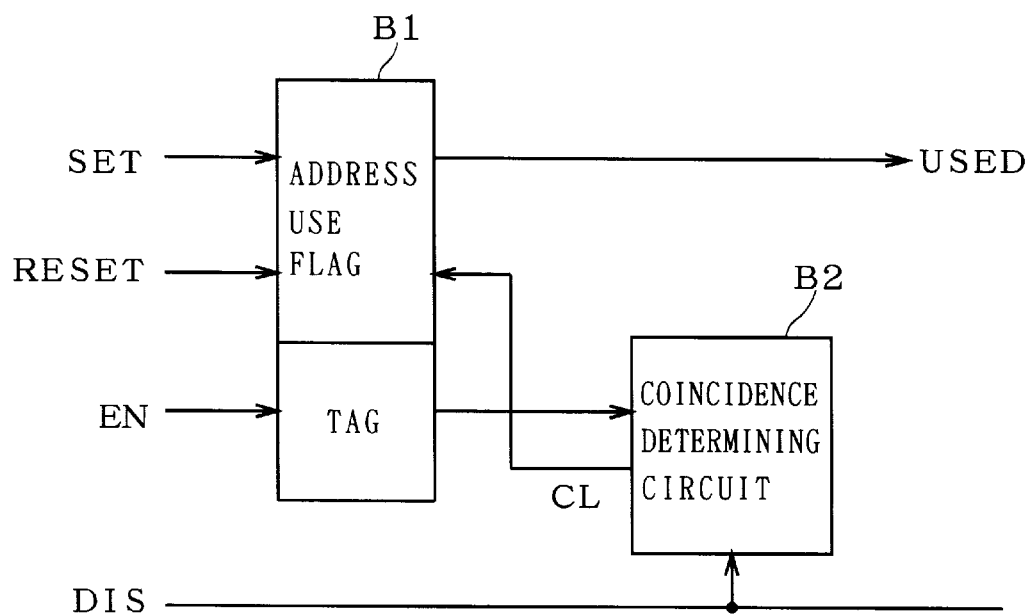
FIG. 21 is a diagram showing an internal structure of the idle address pool IAP in a seventh preferred embodiment of the present invention.
Figure 22:
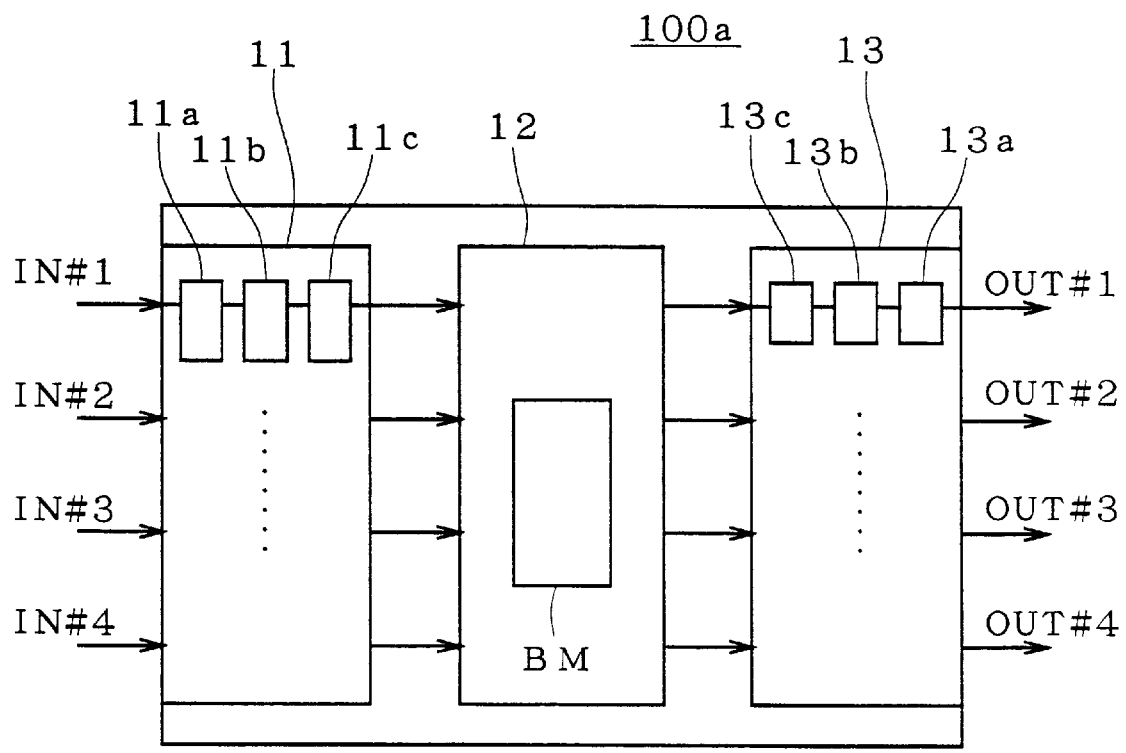
FIG. 22 is a diagram showing the concept of an example of a conventional ATM switch.

FIG. 21 shows an internal structure of the IAP in a seventh preferred embodiment. In the sixth preferred embodiment, the identifiers are used as the tags in the registers B1. Accordingly, for the same reason as that described in the third preferred embodiment, the size of the hardware of the idle address pool IAP must be large.

Hence, this preferred embodiment uses the translation table TA shown in FIG. 15, similarly to the fifth preferred embodiment. The identifiers are translated into entry signals through the translation table TA and used as the tags in the registers B1.

This preferred embodiment provides the following effect. The use of the translation table TA reduces the size of the hardware of the idle address pool IAP.

Modifications

In the second preferred embodiment, the stage body Sn1 may clear the stage Sn having an invalid identifier by invalidating the identifier when receiving the signal CL. The number of the stages and the number of the lines are not limited to those shown in the drawings. Furthermore, although the shared-buffer ATM switches have been described in the first to seventh preferred embodiments, the essence of the invention is related to network communication devices which once store input packets, and resides in the devised method for managing the storage area for the packets. Accordingly, the present invention can be applied not only to the ATM switches but also to other network devices which accumulate packets.

While the invention has been described in detail, the foregoing description is in all aspects illustrative and not restrictive. It is understood that numerous other modifications and variations can be devised without departing from the scope of the invention.

We claim:

1. A network communication device comprising:
    a buffer memory for storing a plurality of packets received from a plurality of input lines, and
    a control portion connected to said buffer memory, said control portion includes:
        a plurality of stages corresponding to each of said plurality of packets, each stage storing management data having an address of a location where the corresponding packet is stored in said buffer memory and a tag which is information related to the corresponding packet, and
        a detection circuit for receiving the tag from each stage and discarding information for discarding a packet, and for detecting a coincidence of the tag stored in each stage with the discarding information, said control portion discarding management data having a tag coinciding with said discarding information in response to a result of said detection circuit.

2. A network communication device comprising:
    a storage area for storing a plurality of received packets received from a plurality of input lines; and
    received packet managing means for managing management data corresponding to the plurality of received packets in a one-to-one manner and each including a tag for identifying a call related to the corresponding received packet and a write address of the corresponding received packet in said storage area;
    wherein said received packet managing means comprises:
        packet managing detecting means receiving discarding information for discarding a packet and said tag, for detecting the management data having the tag corresponding to said discarding information, and discards the management data detected by said packet managing detecting means;
        management data storing means having a plurality of stages connected in series, for storing each said management data into each of said plurality of stages in the order of reception from a preceding stage to a following stage, and
        management data overwriting means for overwriting, into a stage in which the management data detected by said packet managing detecting means is stored, the management data in the following stage.

3. The network communication device according to claim 2, wherein said management data further comprises a destination of the corresponding received packet,
    wherein said packet managing detecting means invalidates the destination of the detected management data, and
    said management data overwriting means overwrites, into the stage in which the management data with said invalid destination is stored, the management data in the following stage.

4. The network communication device according to claim 2, wherein said package managing detecting means includes a plurality of packet managing detecting circuits each provided for each stage and detecting whether the managing data stored in each stage having a tag corresponding to discarding information, and
    said network communication device further comprises discarded number detecting means for totalizing results detected by said individual packet managing detecting circuits.

5. The network communication device according to claim 4, wherein said discarded number detecting means comprises,
    a plurality of constant-current sources each provided for each of said packet managing detecting circuits for applying a constant current when the management data having a tag corresponding to said discarding information is detected,
    a current bus receiving the constant current from said plurality of constant-current sources, and
    an analog-digital converter for analog-digital converting the current on said current bus to produce a result of said totalization.

6. The network communication device according to claim 2, wherein said received packet managing means comprises an idle address pool for managing free addresses of said storage area,
    wherein said idle address pool comprises,
    a plurality of flags corresponding to the plurality of addresses of said storage area in a one-to-one manner for indicating whether the addresses are free or not,
    a plurality of tag storage portions each for storing each said tag corresponding to each flag, and
    address managing detecting means receiving the tags in the tag storage portions and said discarding information for setting the flag corresponding to the tag storage portion having the tag corresponding to said discarding information as being free.

7. The network communication device according to claim 2, wherein an identifier included in a header portion of said received packet is used as said tag.

8. The network communication device according to claim 2, wherein discarding priority included in a header portion of said received packet is used as said tag.

9. The network communication device according to claim 2, further comprising a translation table for receiving an identifier included in a header portion of said received packet and translating said identifier into a signal formed of a smaller number of bits than said said identifier.

10. The network communication device according to claim 6, wherein an identifier included in a header portion of said received packet is used as said tag.

11. The network communication device according to claim 6, wherein discarding priority included in a header portion of said received packet is used as said tag.

12. A network communication device comprising:
 a storage area for storing a plurality of received packets received from a plurality of input lines; and
 received packet managing means for managing management data corresponding to the plurality of received packets in a one-to-one manner and each including a tag for identifying a call related to the corresponding received packet and a destination of the call and a write address of the corresponding received packet in said storage area, wherein said call is a request from a source party; and
 wherein said received packet managing means comprises:
  packet managing detecting means receiving discarding information for discarding a packet and said tag, for detecting the management data having the tag corresponding to said discarding information, and discards the management data detected by said packet managing detecting means;
  management data storing means having a plurality of stages connected in series, for storing each of said management data into each of said plurality of stages in the order of reception from a preceding stage to a following stage, and
  management data overwriting means for overwriting, into a stage in which the management data detected by said packet managing detecting means is stored, the management data in the following stage.

13. The network communication device according to claim 12, wherein a virtual path identifier is included in a header portion of said received packet and is used as said tag.

14. The network communication device according to claim 12, wherein a virtual channel identifier is included in a header portion of said received packet and is used as said tag.

15. A network communication device comprising:
 a storage area for storing a plurality of received packets received from a plurality of input lines; and
 received packet managing means for managing management data corresponding to the plurality of received packets in a one-to-one manner and each including a tag for identifying a call related to the corresponding received packet and a destination of the call and a write address of the corresponding received packet in said storage area, wherein said call is a request from a source party;
 wherein said received packet managing means comprises:
  packet managing detecting means receiving discarding information for discarding a packet and said tag, for detecting the management data having the tag corresponding to said discarding information, and discards the management data detected by said packet managing detecting means; and
 wherein the management data further comprises a destination of the corresponding received packet,
  said packet managing detecting means invalidates the destination of the detected management data, and
  said management data overwriting means overwrites, into the stage in which the management data with said invalid destination is stored, the management data in the following stage.

16. A network communication device comprising:
 a storage area for storing a plurality of received packets received from a plurality of input lines; and
 received packet managing means for managing management data corresponding to the plurality of received packets in a one-to-one manner and each including a tag for identifying a call related to the corresponding received packet and a destination of the call and a write address of the corresponding received packet in said storage area, wherein said call is a request from a source party; and
 wherein said received packet managing means comprises:
  packet managing detecting means receiving discarding information for discarding a packet and said tag, for detecting the management data having the tag corresponding to said discarding information, and discards the management data detected by said packet managing detecting means;
  said packet managing detecting means includes a plurality of packet managing detecting means each provided for each stage, and
  said network communication device further comprises discarded number detecting means for totalizing results detected by said individual packet managing detecting means.

17. A network communication device comprising:
 a storage area for storing a plurality of received packets received from a plurality of input lines; and
 received packet managing means for managing management data corresponding to the plurality of received packets in a one-to-one manner and each including a tag for identifying a call related to the corresponding received packet and a destination of the call and a write address of the corresponding received packet in said storage area, wherein said call is a request from a source party; and
 wherein said received packet managing means comprises:
  packet managing detecting means receiving discarding information for discarding a packet and said tag, for detecting the management data having the tag corresponding to said discarding information, and discards the management data detected by said packet managing detecting means, and
 wherein said discarded number detecting means comprises:
  a plurality of constant-current sources each provided for each said packet managing detecting means for applying a constant current when the management data having a tag corresponding to said discarding information is detected,
  a current bus receiving the constant current from said plurality of constant-current sources, and an analog-digital converter for analog-digital converting the current on said current bus to produce a result of said totalization.

18. A network communication device comprising:

a storage area for storing a plurality of received packets received from a plurality of input lines; and received packet managing means for managing management data corresponding to the plurality of received packets in a one-to-one manner and each including a tag for identifying a call related to the corresponding received packet and a destination of the call and a write address of the corresponding received packet in said storage area, wherein said call is a request from a source party; and wherein said received packet managing means comprises:

packet managing detecting means receiving discarding information for discarding a packet and said tag, for detecting the management data having the tag corresponding to said discarding information, and discards the management data detected by said packet managing detecting means;

an idle address pool for managing free addresses of said storage area; and wherein said idle address pool comprises:

a plurality of flags corresponding to the plurality of addresses of said storage area in a one-to-one manner for indicating whether the addresses are free or not, a plurality of tag storage portions each for storing each said tag corresponding to each flag, and address managing detecting means receiving the tags in the tag storage portions and said discarding information for setting the flag corresponding to the tag storage portion having the tag corresponding to said discarding information as being free.

* * * * *